(12) United States Patent
D'Alessandro et al.

(10) Patent No.: US 8,369,707 B2
(45) Date of Patent: Feb. 5, 2013

(54) DYNAMIC ROUTING OF OPTICAL SIGNALS IN OPTICAL NETWORKS

(75) Inventors: Alessandro D'Alessandro, Turin (IT); Marco Muratori, Rome (IT)

(73) Assignee: Telecom Italia S.p.A., Milan (IT)

( * ) Notice: Subject to any disclaimer, the term of this patent is extended or adjusted under 35 U.S.C. 154(b) by 715 days.

(21) Appl. No.: 12/448,471

(22) PCT Filed: Dec. 22, 2006

(86) PCT No.: PCT/EP2006/012454
§ 371 (c)(1),
(2), (4) Date: Dec. 4, 2009

(87) PCT Pub. No.: WO2008/077420
PCT Pub. Date: Jul. 3, 2008

(65) Prior Publication Data
US 2010/0086306 A1   Apr. 8, 2010

(51) Int. Cl.
H04J 14/02 (2006.01)
G02F 1/00 (2006.01)
H04L 12/28 (2006.01)

(52) U.S. Cl. .............. 398/79; 398/66; 398/78; 398/87; 398/59; 370/351; 370/255

(58) Field of Classification Search ............. 398/42, 398/43, 66, 68, 78, 79
See application file for complete search history.

(56) References Cited

U.S. PATENT DOCUMENTS

| | | | | |
|---|---|---|---|---|
| 6,111,673 A * | 8/2000 | Chang et al. | | 398/79 |
| 6,538,777 B1 | 3/2003 | Barry et al. | | |
| 6,681,232 B1 | 1/2004 | Sistanizadeh et al. | | |
| 7,859,995 B2 * | 12/2010 | Bejerano et al. | | 398/79 |
| 2002/0018264 A1 * | 2/2002 | Kodialam et al. | | 359/128 |
| 2002/0030864 A1 | 3/2002 | Chaudhuri et al. | | |
| 2003/0016414 A1 | 1/2003 | Solheim et al. | | |
| 2003/0020977 A1 * | 1/2003 | Smith et al. | | 359/110 |
| 2003/0065811 A1 * | 4/2003 | Lin et al. | | 709/232 |
| 2003/0227924 A1 * | 12/2003 | Kodialam et al. | | 370/395.21 |
| 2004/0228323 A1 * | 11/2004 | Acharya et al. | | 370/351 |
| 2005/0069314 A1 * | 3/2005 | De Patre et al. | | 398/5 |
| 2006/0051090 A1 * | 3/2006 | Saniee et al. | | 398/59 |
| 2010/0086306 A1 * | 4/2010 | D'Alessandro et al. | | 398/79 |

FOREIGN PATENT DOCUMENTS
EP    1 303 160 A2    4/2003

OTHER PUBLICATIONS

Bo, L. et al., "Routing and Wavelength Assignment vs. Wavelength Converter Placement in All-Optical Networks," IEEE Optical Communications, pp. S22-S28, (Aug. 2003). Taira, K. et al., "Efficient Lightpath Routing in Wavelength-Routed Optical Networks," ICOIN 2002, LNCS 2342, pp. 291-304, (2002).
Yang, X. et al., "Interdomain Dynamic Wavelength Routing in the Next-Generation Translucent Optical Internet," Journal of Optical Networking, vol. 3, No. 3, pp. 169-187, (Mar. 2004).

* cited by examiner

Primary Examiner — Shi K Li
Assistant Examiner — Oommen Jacob
(74) Attorney, Agent, or Firm — Finnegan, Henderson, Farabow, Garrett & Dunner, L.L.P.

(57) ABSTRACT

A method for dynamic routing an optical signal in an optical network is provided, including: executing a shortest-path algorithm receiving input concerning a source node, a destination node and the topology of the network, providing a shortest-path tree comprising nodes and arcs connecting the nodes, the shortest-path tree comprising branches along which an effective attenuation is no greater than a predetermined limit, each branch comprising an end node and each end node being associated with a corresponding set of wavelengths; checking, for each end node having no wavelength conversion resources and for each wavelength, if the end node is connected to at least another node external to the branch through the wavelength; excluding, for any end node if the result of the checking is negative for at least one wavelength, the at least one wavelength from the corresponding set of wavelengths, thus updating the topology; and re-executing the shortest-path algorithm.

15 Claims, 16 Drawing Sheets

REGENERATOR

WAVELENGTH CONVERTERS

DYNAMIC ROUTING OF OPTICAL SIGNALS IN OPTICAL NETWORKS

CROSS REFERENCE TO RELATED APPLICATION

This application is a national phase application based on PCT/EP2006/012454, filed Dec. 22, 2006, the content of which is incorporated herein by reference.

TECHNICAL FIELD OF THE INVENTION

The present invention relates to dynamic routing of optical signals in optical networks.

BACKGROUND ART

In the complex scenario of telecommunications networks, a trend has been establishing itself over the last few years to consolidate certain technologies already in use over the last decade (IP and Ethernet) and to simplify the protocol stack, enriching the pre-existing technologies with new functionality (Pseudowire on Ethernet, QoS on MPLS-TE) with the aim of achieving simpler and cheaper-to-maintain networks.

However, there is no lack of innovative solutions in a market continually in search of solutions aimed at curbing network operating expenses (OPEX) and the possibility of quickly introducing new services on the market, the proliferation of which is driven by the widespread migration of many services to IP. ASON/GMPLS (Automatically Switched Optical Network/Generalised Multi Protocol Label Switching) technology represents one of the innovative solutions of recent years, its characteristics of flexibility, dynamism and automation of the offered services blending well with the network operators' emerging needs.

The by now consolidated trend of services offered by operators and ASPs (Application Service Providers) converging on IP and the extensive use of the IP protocol for computer applications has caused a growth in packet traffic, the characteristics of which are difficult to normalize, especially regarding the coexistence of applications with profoundly different requirements.

ASON/GMPLS technology appears appropriate for offering a wideband transport network that is flexible and dynamic at the same time, able to support IP traffic variability because it allows a harmonious use of pre-existing network technologies through the adoption of a control architecture and special signalling, routing, and discovery mechanisms.

For example, it is possible to integrate networks based on packets, time division, wavelength switching, etc. Each of these technologies has characteristics that make full integration a challenge. The introduction of ASON/GMPLS technology simplifies this process, for example enhancing the lower network levels (wavelength or fibre switching, or time division based) with new functionality, such as the dynamic and automatic creation, deletion and modification of circuits. This requires the introduction of new routing mechanisms that are unlikely to represent a simple transposition of those already tested in the world of packets to the world of circuits. The adaptation of these mechanisms is even more difficult when they must handle new degrees of freedom such as in the case of transparent/translucent optical networks, where it is necessary to check that the optical signal does not accumulate excessive degradation along the route found and so be correctly decoded at the receiver.

For the purposes of the present invention, with "transparent optical network" it is intended an optical network where the transmission of the optical signal is independent of the specific characteristics (digital or analogue type, modulation scheme, signal format, bit rate) of the actual data to be transported through the optical layer; with "opaque optical network" it is intended an optical network making use of 3R signal regeneration at (every) intermediate node along a connection; and with "translucent optical network" it is intended an optical network where a signal is made to propagate in the optical domain as long as possible with respect to optical transmission impairments and signal adaptation or wavelength conversion requirements and then it is regenerated making use of 3R signal regeneration.

An example of network node architecture is shown in FIG. 1. It comprises a number of line interfaces $I_1$-$I_4$ equipped with multiplexing/demultiplexing systems $M/D_1$-$M/D_4$ for the wavelengths in output from/input to the device, a (transparent) wavelength switching matrix SM, a set of regenerators 3R that can be accessed by a signal in transit through the node to restore the quality level it had at source, a set of wavelength converters C that can be accessed by a signal in transit through the node if the signal's wavelength is already in use on the output interface, and a set of transponders T for "colouring" (i.e. assigning a well defined wavelength) the signals in input to the node and their accurate specification, for example, in terms of power level.

An example of translucent network is shown in FIG. 2. It comprises an outer layer based on border Optical Digital Cross Connect nodes (B-ODXC) equipped with transponders T and optionally with regenerators 3R and wavelength converters C, an inner layer that comprises core Optical Digital Cross Connect nodes (C-ODXC) optionally equipped with Regenerators 3R and wavelength converters C and client equipments CE.

With regards to the presence of regenerators and wavelength converters on the various network nodes, it should be stated that these could be equipped in varying numbers (in principle, a node could be purely transparent) based on the results of network planning. Furthermore, their availability on the network changes dynamically according to the state of the network itself and the routing method that is presented herein takes this variability into account.

Thus, under certain network load conditions, it could happen that the regeneration and/or wavelength conversion function is not available on all network nodes. In this type of scenario, it is essential to assess the feasibility of new network routes because there is a maximum length that an optical signal can travel without being regenerated. This length depends on many factors, such as, for example, the type and length of fibre, specifications of the switching matrices, bit rate and the number of waves and their wavelengths. Optical signals degrade along the route due to a number of physical phenomena such as attenuation, dispersion, non-linear effects, etc. When degradation prevents correct reconstruction of the signal at the receiver then it is necessary to regenerate the signal. This process involves electronic components that, in the current state of the technology, are quite expensive. For this reason, it would be convenient for network operators to limit the use of these resources and, in general, of all those resources that, due to their high cost, tend to be present on the network in limited numbers and which, in the following, shall be called valuable resources.

In traditional opaque networks (i.e. networks with nodes fully equipped with regenerators) each node regenerates the received optical signal. In this way, the characteristics that the signal had at source are restored, thereby allowing an arbitrary route to be feasible. In networks of this type, the routing mechanisms disregard physical degradation as the feasibility of each network path is guaranteed by design.

To reduce costs, it is possible to build a transparent optical network, or rather one based on nodes that switch the optical signal without its conversion into electrical form. A telecommunication network of this type is limited in terms of size and is hard to run in practice. These limitations are overcome with the introduction of hybrid nodes in the network, or rather of nodes able to switch the optical signals in a transparent manner and also to regenerate them or change the wavelength when required. Nodes of this type introduce significant flexibility into the network (translucent network), whilst at the same time contain costs. A network of this type can nevertheless contain also totally transparent or opaque nodes, coherently with the results of the network planning study.

The method used to find a route and a wavelength is generally called the "Routing and Wavelength Assignment (RWA) problem". There is much research and study aimed at identifying the best way of resolving this problem, both in a concurrent manner and by uncoupling it into two sub-problems: the routing problem and that of wavelength assignment. Nevertheless, typically transmission degradation is not taken into account. A brief summary of the state of the art in this field is provided below.

In publication Li Bo, C. Xiaowen, K. Sohraby, "*Routing and wavelength assignment vs. wavelength converter placement in all-optical networks*", IEEE Optical Communications, pp. S22-S28, August 2003 the authors propose a solution to the RWA problem based on searching for a set of paths between each source-destination pair that are generally the k shortest paths of the link-disjoint type. A routing request is satisfied by choosing a path from the set of those pre-computed and then assigning a wavelength from those available (for example, with the first-fit method). The weight associated with the routings not only depends on wavelength availability, but also on the path length. In addition, the authors suggest taking the position of the wavelength converters into consideration in order to minimize the probability of blockage and suggest the Minimum Blocking Probability First (MBPF) algorithm for solving the RWA problem.

In U.S. Pat. No. 6,538,777 the authors propose an assignment method for routes and wavelengths based on the change in the network's state following a certain routing rather than on the state of the network prior to routing. The objective of this approach is that of obtaining a flexible network state, minimizing the risk that the assignment of a given route eliminates the availability of the only link able to provide a connection between a pair of nodes.

In publication K. Taira, Y. Zhang, H. Takagi, S. K. Das, "*Efficient Lightpath Routing in Wavelength-Routed Optical Networks*", ICOIN 2002, LNCS 2343, pp. 291-304, 2002 the authors propose an exhaustive algorithm that resolves the RWA problem. It first resolves the routing problem and subsequently the wavelength assignment problem. Both problems are formulated as routing problems and resolved using shortest-path routing techniques on the corresponding graphs obtained from transformation of the graph associated with the network.

US 2003/0016414 proposes a solution that takes into account the degradation of an optical signal during its propagation across the network. The authors point out that the wavelengths have different performances in terms of distance traveled before their quality drops below a certain level. They propose a method that selects the most suitable wavelength based on the path distance identified during the routing phase. A path that is too long is divided in two or more sub-paths and the method is iteratively applied to the individual segments. In this way, an attempt to use the minimum number of regeneration and/or wavelength conversion resources is made. The method applies to an optical network with switching nodes equipped with wavelength switches, and a set of regenerators and wavelength converters for regenerating and/or modifying the wavelengths.

Xi Jang, Byrav Ramamurthy, "*Interdomain dynamic wavelength routing in the next-generation translucent optical Internet*", Journal of optical networking, Vol 3, No 3, March 2004 (CPA) proposes another method that takes the physical degradation of the optical signals into account. This method concerns an iterative procedure based on the Dijkstra's algorithm (which is a real-world implementation of Shortest Path First (SPF) routing algorithm used in internet routing), the cost function of which depends on the length of the link, the available regeneration resources and the number of available wavelengths on the link. The cost function is parameterized with a parameter d, which takes the number of failed iterations L into account when searching for a route. The higher the value of L, the more the solutions whose traversed nodes have a greater availability of regenerators/wavelengths are favoured.

In particular, the document describes an interdomain dynamic wavelength-routing scheme, which distributes interdomain routing computation to domain gateway. The routing computation at the domain gateways is further divided into three functions. First, a domain gateway uses an LRS (Local Routing Schemes) to compute local routes between itself and each interior node in the same domain as well as between itself and each neighboring domain gateway. Second, a next-hop computation function is used to join the alternate local routes of this domain to the alternate routes of adjacent domains to form the next-hop interfaces leading to desired destinations. Finally, a hop-by-hop lightpath selection function uses the obtained local and next-hop routing information to establish interdomain end-to-end lightpaths.

OBJECTIVE AND SUMMARY OF THE INVENTION

The Applicant has noticed that all the above described solutions are affected by drawbacks.

Regarding the above-cited publication of Li Bo et al., the U.S. Pat. No. 6,538,777, and the publication of K. Taira et al., the Applicant observes that all the described solutions do not take signal degradation into account, and so turn out to be inadequate for a transparent network.

With regard to US 2003/0016414, the Applicant observes that this method does not assure the feasibility of a route (from the transmission degradation standpoint), resulting in a high blocking probability on a congested network where very few regenerators are available.

For what concerns the above-mentioned publication of Xi Jang et al., the Applicant observes that this method does not consider, in the routing computation, neither the effective availability of network resources (availability of wavelengths) nor the observance of physical constraints (optical signal degradation, wavelength continuity, etc.). Routing computation is followed by a verification phase for the signal quality and wavelength continuity requirements that, if not satisfied, cause the currently found temporary solution to be abandoned and the search algorithm to be restarted with new parameters. The method terminates after having found a solution or after LMAX failed iterations.

Moreover, the Applicant has verified that the application of this method to some network topologies shows certain limits that are described in the following.

Let us consider first the network topology represented by the graph in FIG. 3 by way of example. The available wavelengths are shown close to the arcs. For simplicity, let us assume that none of the nodes has accessible 3R regenerators and that the parameter that takes the link length/degradation into consideration has the same value for all the links. Let it be assumed that there is a routing request between node A and node E. In the first instance, the algorithm assigns the same weight to all of the links, generating the shortest-path tree of FIG. 4. However, the found route (A-D-E) is not physically practicable because of the condition of wavelength continuity is not satisfied.

The method under consideration responds to this condition by modifying the metrics and rerunning the search algorithm. However, with the assumptions that were made, the method does not find a solution because the weights associated with the arcs do not change as the number of iterations grow and therefore the algorithm persists with the same route, even though two feasible paths exist: A-C-D-E and A-B-D-E.

The method under consideration also exhibits unsatisfactory behaviour in handling the constraint of maximum degradation that the signal can undergo during its propagation. Let $L_0$ be a measure of the physical degradation along the link between two nodes (for example, a quantity that collectively represents the physical phenomena that degrade the optical signal, such as attenuation, dispersion, non-linear phenomena, etc.), and $3L_0$ the maximum acceptable degradation without loss of information. The topology shown in FIG. 5 is taken as an example to describe the behaviour of the method under consideration. The following assumptions are made:
- the wavelength continuity constraint is respected, as all possible wavelengths ($\lambda 1$, $\lambda 2$ and $\lambda 3$ in the specific example) are available along every link;
- node R is a node with a regeneration resource; and
- node A is the source node and G is the destination node.

The first iteration of the algorithm, or rather that based on the assignment of unitary weights, produces in output the solution shown in FIG. 6, i.e. comprising the two paths A-C-F-R and A-B-D-E-G. From the figure it can be deduced that the solution along the path A-B-D-E-G is not practicable, as the sum of the degradations along the path (equal to $4L_0$) exceeds the maximum threshold (equal to $3L_0$). Iteration after iteration, the variable-weight metrics cut the weight related to the F-R link (which could be null in the end). The cost associated with the other arcs, instead, remains unchanged, irrespective of the cardinality of the executed iteration. The graph associated with the last iteration, to which the SPF will be applied, is shown in FIG. 7, with a null weight on the link F-R.

In this case too, the method will produce in output the same shortest-path tree of FIG. 6, which as already stated is not feasible because it violates the condition associated with the maximum permitted degradation. However, a feasible path exists that cannot be found by the algorithm: the path A-C-F-R-E-G. In fact, the two sections A-C-F-R and R-E-G have respective overall degradations within the maximum threshold limit of $3L_0$ and node R allows regeneration between them.

In both of the examples shown, the method under consideration is not able to find a solution because it constructs a route (solution) without taking the physical constraints into account.

Another condition in which the method under consideration is not able to find a solution is that where it is necessary to cross the same link twice. As the method under consideration is based on the SPF algorithm, which is of the additive type, it is not possible to cross the same branch of a graph (i.e. the same link in a network) more than once.

The objective of the present invention is to provide a routing method that solves the problems of the known methods. This objective is achieved by the present invention, relating to a method for dynamic routing of optical signals in an optical network, as claimed in the appended claims.

The present invention achieves the aforementioned objective in two phases: in the first phase, a feasible route is searched and in the second phase the resources usage along the identified route is optimized.

The first phase includes a linear search and, if this is unsuccessful in finding a suitable path, also a non-linear search. In particular, the first phase comprises searching for a possible path that satisfies the physical constraints of signal degradation and wavelength continuity. This phase comprises an iterative procedure based on the Shortest Path Algorithm (SPA), the cost function of which depends on the effective degradation accumulated by the solution at a certain time with respect to:
- the maximum permitted effective signal degradation (i.e. signal information is preserved);
- the distance of the last node added to the ongoing solution (i.e. a partial solution in the SPF routing process) from the nearest regeneration node;
- the available regeneration resources on the nodes;
- the number of available wavelengths on a link; and
- the cost of traversing the nodes.

The cost function also depends on the iteration for which the solution is being evaluated. The greater the number of failed iterations, the more the procedure favours solutions on links with greater wavelength availability or on nodes with greater regenerator availability. The solution provided by the method satisfies, by construction, the physical degradation constraints because wavelength continuity and the signal quality requirements fulfillment are guaranteed. In the case in which a solution to the problem is not found in this phase, a non-linear search procedure is then applied, in a way explained in detail later on.

If a solution is found, either in the case of linear or in the case of non linear method, the second phase follows for the optimization of network resources along the identified route (choice of wavelength and allocation of regenerators and wavelength converters).

The technique of the present invention can be applied for network planning as well during real-time routing operations of a network so designed.

The present invention thus relates to a method for dynamic routing an optical signal in an optical network comprising a plurality of nodes, comprising:
- executing a shortest-path algorithm receiving input information concerning a source node, a destination node and the topology of the network, and providing as output a shortest-path tree comprising nodes and arcs connecting said nodes, the shortest-path tree comprising a plurality of branches along which an effective attenuation accumulated by the optical signal is at most equal to a predetermined limit, each branch comprising an end node and each end node being associated with a corresponding set of wavelengths;
- checking, for each end node that has no wavelength conversion resources and for each wavelength of the corresponding set of wavelengths, if said end node is connected to at least another node external to the corresponding branch through said wavelength;
- excluding, for any end node for which the result of said checking is negative for at least one wavelength of the corresponding set of wavelengths, said at least one wavelength from the corresponding set of wavelengths, thus updating the topology; and re-executing the shortest-path algorithm with the updated topology.

Preferably, the method further comprises:

varying, if the result of said checking is positive for all the end nodes and for all the wavelengths of the corresponding set of wavelengths, a value of a parameter;

updating network parameters based on the current value of said parameter, thus updating the topology;

re-executing the shortest-path algorithm with the updated topology.

Preferably, said checking is a first checking and the method further comprises:

second checking, if the result of said first checking is positive for all the end nodes and for all the wavelengths of the corresponding set of wavelengths, if any one of said end nodes coincides with the destination node;

wherein the shortest-path algorithm is re-executed only if the result of the second checking is negative.

The method may further comprise:

third checking if a current value of said parameter is over a predetermined threshold;

wherein the shortest-path algorithm is re-executed only if the result of the third checking is negative.

The set of wavelength associated with an end node may consist of all the wavelengths that ensure wavelength continuity from the source node to the end node or from a wavelength converter resource in the same branch of the end node and the end node.

Executing the shortest-path algorithm preferably comprises growing the shortest-path tree by adding new nodes.

Preferably, the new node is added to said branch if a cumulated degradation loss from the source node to the new node along said branch is less than a maximum permitted value.

Moreover, the new node is added to said branch if wavelength continuity is assured from the source node to the new node along said branch or from a wavelength converter resource in the same branch of the end node and the end node.

The new node is added to said branch if an overall cost function from the source node to the new node along said branch is minimum with respect to other possible new nodes.

Preferably, the cumulated degradation loss is zeroed if the new node is a regeneration node.

The cost function is preferably dependent on said parameter.

Moreover, the cost function is preferably dependent on at least one among the following:

available wavelengths in a link to the new node;
available regeneration resources in the new node;
cumulated degradation loss of the signal.

The cost function may be is calculated by a first expression if the cumulated degradation loss of the signal along said branch is less than a limit value and by a second expression if the cumulated degradation loss of the signal along said branch is higher than the limit value.

The first expression preferably favours new nodes having a larger number of regeneration resources and reachable through links with greater wavelength availability. The second expression preferably favours new nodes for which the possibility of reaching a regenerator is known in advance.

DETAILED DESCRIPTION OF PREFERRED EMBODIMENTS OF THE INVENTION

Figure 8:
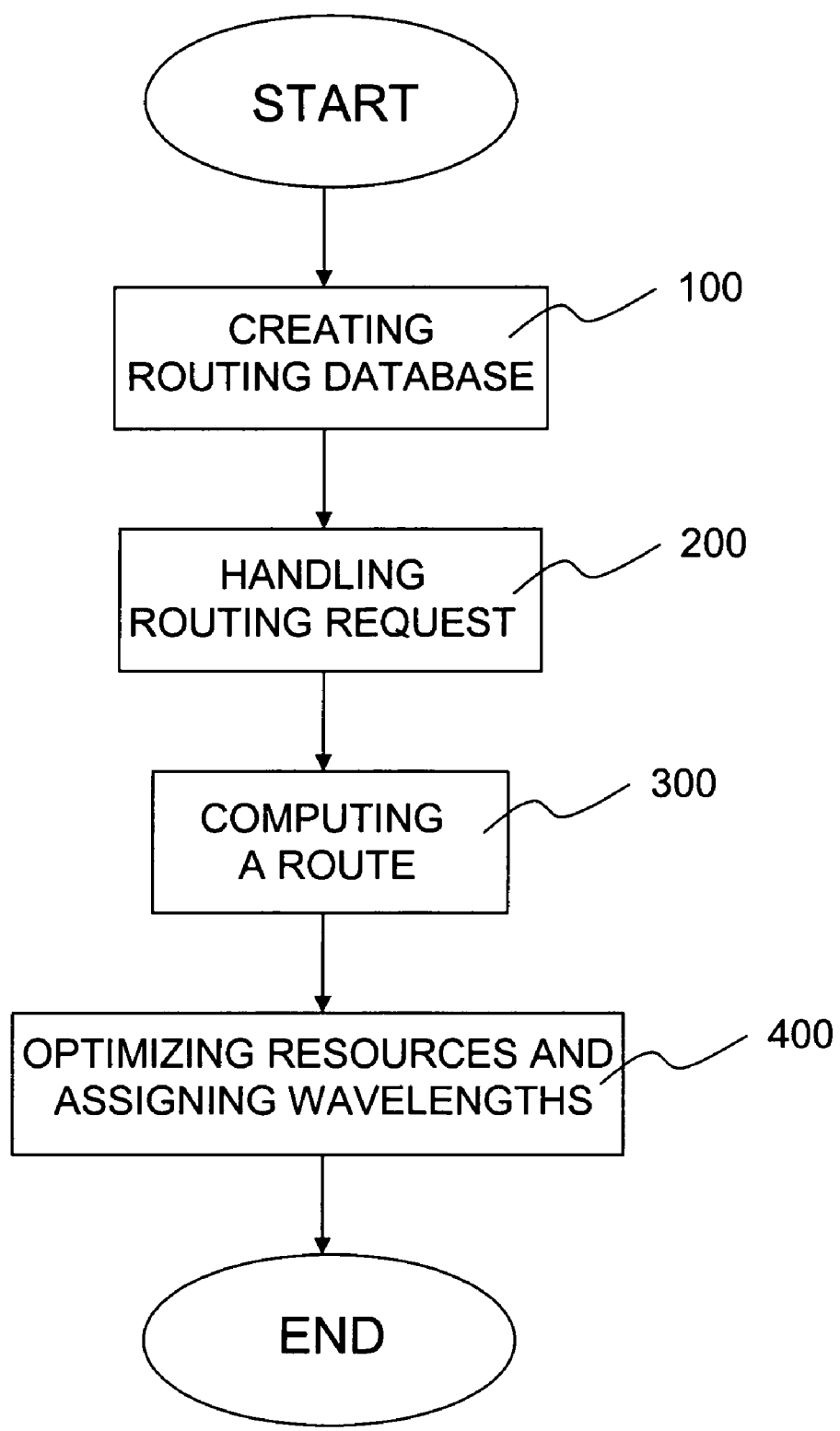
FIGS. 8, 9, 12, 13, 25 and 29 are flowcharts related to the method of the present invention.

With reference to FIG. 8 it is shown the flowchart of the main steps of the method according to a preferred embodiment of the present invention.

The main phases of the method are the following:
Creating a Routing Database (RDB) (block 100);
Handling a routing request (block 200);
Computing a route (block 300); and
Optimizing resources along the computed route and assigning the wavelengths (block 400).

Block 100 provides for the creation of the necessary preliminary information for route searching. In particular, block 100 comprises the following phases:

collecting the topological information of the network and the nodes description; and computing a vector (a set of ordered values) for each bundle of homogenous interfaces (i.e. interfaces with the same characteristics with respect to routing purposes, e.g. TE-links) deployed in the network, the vector's elements quantifying the degradation that the optical signal undergoes in travelling over the shortest route connecting the above bundle of interfaces to the regeneration nodes. These values are obtained solving the Shortest Path Problem by a Shortest Path Algorithm (SPA) (modified as described hereafter) applied to each bundle of homogenous interfaces, applying for example the Floyd-Warshall algorithm or the Djistkra algorithm. The overall degradation of the optical signal during its propagation over the network is expressed as the cost of each link and node. If, during the SPA computation, the overall cost accumulated along a particular branch of the tree exceeds the maximum allowed degradation value (for a given signal in function of, for example, the power level, the bit rate or the optical band utilized), the search for a solution (of the SPA) along that branch is interrupted.

A Constrained Shortest Path Tree (CSPT) consisting of only the paths having a cost below a certain threshold is obtained at the end of the SPA. The cost represents the degradation the signal suffers traversing links and nodes. In the above computation, an additive cost function is utilized that takes into account the above mentioned costs.

The degradation accumulated by the signal along a given route (i.e. the total cost along a path) will be called "Effective Distance". For a given optical signal, it can be said that a certain path is feasible if the Effective Distance that it must travel to reach a regeneration node or a destination node is below a certain threshold.

The set of Effective Distances calculated for each bundle of homogenous interfaces towards the regeneration nodes are organized in vectors that provide the proposed RWA method with reachability information towards regeneration nodes. Those vectors are also exploited to favour routing to regeneration resources when the optical signal's degradation reaches a certain threshold. Computation of the Effective Distances will be explained with greater detail in the following.

Block 200 provides for handling a routing request. The received routing request is a request to route data from a given source node $S_i$ (Initial source) to a given destination node $D_j$ (Initial destination), including any signal specification details and routing constraints (for example, a request for a node-disjoint or link-disjoint route) by opportunely modifying the network topology or the algorithm's internal parameters.

Block 300 will be described with greater detail in the following and provides for a two-stage search: in a first stage, a route is searched by a linear search module; if a route is not found, the first stage is followed by a second stage in which a non-linear search module is activated for a non-linear solution of a route. The different phases of the methods share some functions (i.e. functional blocks), as will be apparent in the following. If a route is found it is passed in input to a refinement module (block 400) comprising a phase of assignment of wavelengths and allocation of regeneration and wavelength converter resources.

Figure 9:
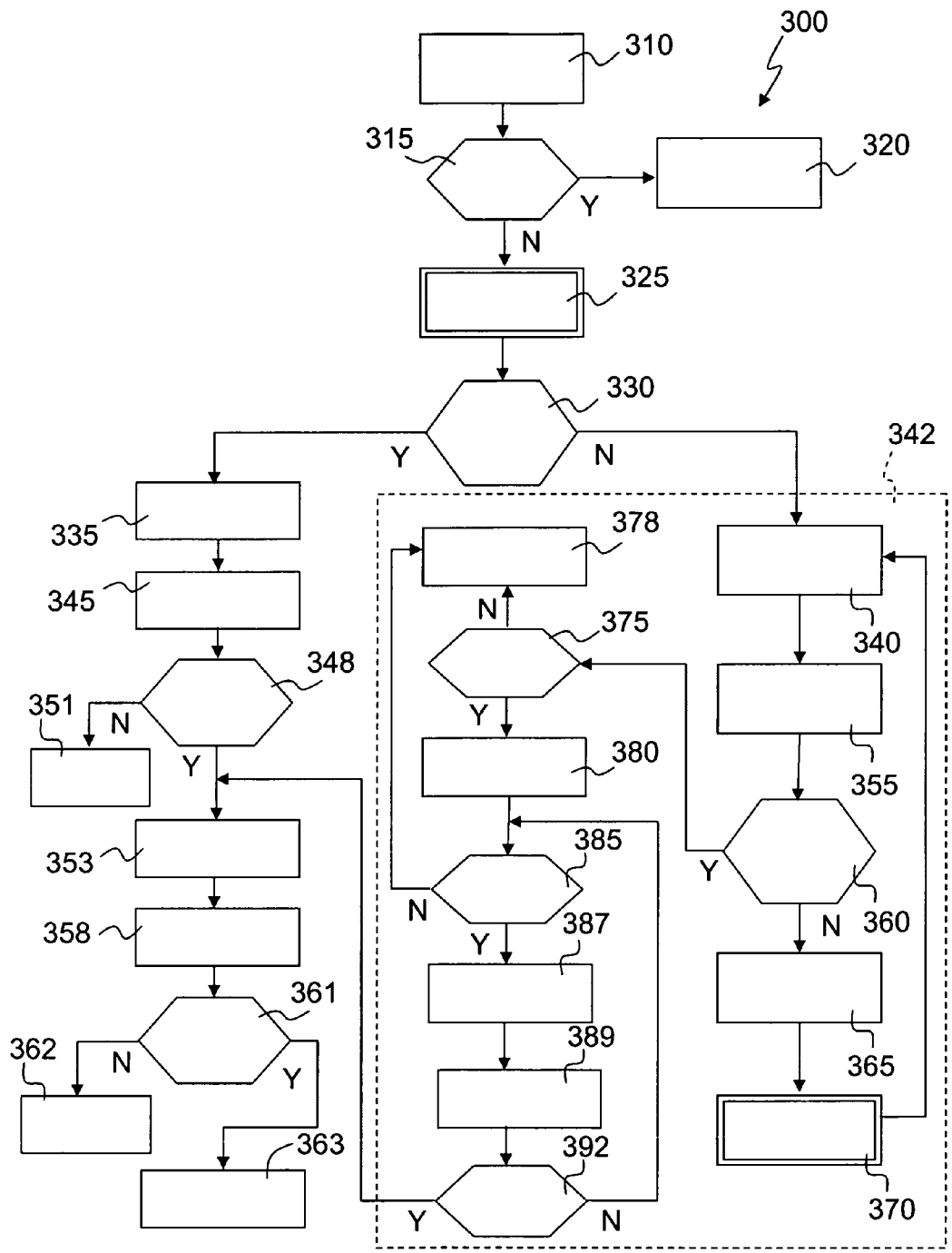

FIG. 9 shows with greater detail the functions of block 300 relating to the route computation.

Block 300 comprises a first block 310 that memorizes the above mentioned source node $S_i$ and destination node $D_j$.

Block 310 is followed by block 315 that checks if source $S_i$ and destination $D_j$ coincide.

In the affirmative (source and destination coincide, $S_i=D_j$) then a solution to the routing problem exists and block 315 is followed by block 320 that terminates the operation of block 300 and supplies in output the found route (e.g. $S_i$–$D_j$).

If source node $S_i$ and destination node $D_j$ do not coincide ($S_i \neq D_j$), block 315 is followed by block 325 containing a core algorithm (here and in the following represented by a double-line box) that will be described with greater detail in the following.

Block 325 tries to find a linear solution to the routing problem from a source node $S_i$ to a destination node $D_j$. Block 325 therefore identifies the operations of a linear search module. In particular, block 325 receives as inputs the source node $S_i$, the destination node $D_j$ and the graph associated to the network topology (stored in the RDB) and outputs a Constrained Shortest-Path Tree (CSPT), which consists of only the paths having a cost below a certain threshold. Cost represents physical impairment and the threshold is set in a way to guarantee the correct signal detection at the receiver.

In the above computation, a cost function is utilized that depends on the network state and on the residual Effective Distance of a given temporary solution during routing. This approach enables the weight of certain links to vary, favouring the reaching of regeneration resources. Moreover the cost function is parametric and depends on the number of iterations to find a solution.

The CSPT computed by block 325 is fed to a block 330 that checks if the destination node $D_j$ is comprised in the above CSPT.

In the affirmative (the destination node $D_j$ is included in the CSPT), block 330 is followed by a refinement block 335, which provides a refinement for the linear solution to the routing problem, otherwise block 330 is followed by block 340 that activates, based on the above CSPT, a non-linear solution search.

Block 335 selects the branch of the CSPT that includes the destination $D_j$ and identifies the regenerators present along that branch. The Source-Regenerator i- . . . -Regenerator j-Destination sequence ($S_i$-$R_i$- . . . -$R_j$-$D_j$) constitutes a path that is called "logical path".

Focusing on the detected logical path, the algorithm determines the physical path, i.e. the actual sequence of nodes and links from the source node to the destination node that represents the searched solution, by means of an optimisation process (block 345 successive to block 335, described with greater detail in the following). This physical path may partially differ from the physical path obtained by block 325.

Block 345 also checks the feasibility of the path that has been found in terms of wavelength continuity. This function is described in detail further on.

Block 345 is followed by a block 348 that checks if wavelength continuity is assured. In the negative, an error message is returned (block 351). In the positive, the found route is stored as "base solution" and a variable flag is set to the value 1 (block 353).

Block 353 is followed by block 358 that aims to improve the "base solution" as will be described in more detail further on. If block 358 finds a better solution than the "base solution" it stores that route as "advanced solution" and sets the variable flag to the value 2.

Block 358 is followed by block 361 that checks if an "advanced solution" was found. In the affirmative, it outputs the "advanced solution" (block 363) otherwise it outputs the "base solution" (block 362).

Block 300 doesn't refine the solution in terms of wavelengths, conversion and regeneration resources assignment. This is the objective of block 400 of FIG. 8 that will be described in more detail in the following with reference to FIG. 29.

As previously anticipated, block 340 (reached in case of negative result of the linear search of a route to the destination node by the core algorithm 325) is a first step of a non-linear solution search carried out by a non-linear search module, represented as a whole with a dotted-line block 342. This non-linear solution search is activated if a route to the destination is not found in the first running of the core algorithm (block 325). The non-linear solution search includes one or more executions of the core algorithm previously described, here represented by block 370, performing the same actions as block 325. Block 342 performs a non-linear operation for finding a solution to the routing problem that has not been solved by block 325.

When block 340 is entered, all the regenerators R included in the CSPT obtained by application of the core algorithm (block 325, or block 370 described later) are identified. Moreover block 340 also checks if the destination node is included in the CSPT (in case of core algorithm executed in block 370 described later).

Block 340 is followed by a block 355 that creates "logical segments", each logical segment being made of the source node $S_i$ or a regenerator $R_y$ present on the CSPT as one end and one of the regenerators present on the CSPT as far end (e.g. $S_i$-$R_i$, $S_i$-$R_j$ etc. or $R_j$-$R_k$, $R_j$-$R_z$).

When block 355 is entered in subsequent iterations after the first one, there may be logical segment where the far end is the destination node $D_j$ (e.g. $R_K$-$D_j$).

Block 355 is followed by block 360 that checks if every regenerator included in the CSPT has acted as source node in a calculation step made by means of the core algorithm (block 370).

In the negative of block 360, a regenerator node R (block 365 successive to block 360) is chosen among those ones calculated in the previous steps and not yet acting as a source node in the core algorithm block, to identify a solution towards the destination node $D_j$. The core algorithm (block 370) is then executed again producing a new CSPT using as source the selected regeneration node R; from block 370 the procedure returns to block 340.

When block 340 is entered from block 370, the regeneration nodes and possibly the destination node $D_j$ included in the CSPT are identified and stored.

Block 360, in the affirmative, is followed by block 375 that checks if at least one logical segment including the source $S_i$ exists ($S_i$-Ri) and at least one logical segment including the destination node $D_i$ exists ($R_j$-$D_i$). This is a necessary (but not sufficient) condition for the existence of a solution.

If this condition is not met, then an error message is displayed (block 378) indicating that no solution exists.

If this condition is met, then block 375 is followed by block 380 that calculates logical paths, that is the routes between the source $S_i$ and the destination $D_i$ via regeneration nodes. Logical paths are calculated joining together different logical segments. The thus-constructed logical paths are ordered with respect to the number of regenerators utilized. The greater the number of regenerators involved, the greater the cost assigned to the path.

Block 385 checks if at least a logical path to be checked exists. In the negative an error message is displayed (block 378) indicating that no solution exists. In the affirmative, block 385 is followed by block 387 that takes into account the least cost logical path (Block 387).

The solutions that are found with the non-linear search module match the maximum degradation constraints, but wavelength continuity along the source-to-destination path is not assured.

The block 389 performs the same action as block 345 (wavelength continuity check and segment optimization), i.e. it determines the feasibility of the least-cost logical path. It identifies the physical path (e.g. nodes and links along the logical path) through an optimization process and guarantees the wavelength continuity. If the wavelength continuity cannot be guarantee for a certain logical path (block 392) then another logical path, if it exists, is selected by block 387 and fed to block 389.

The process continues with block 353 previously described.

Figure 10:
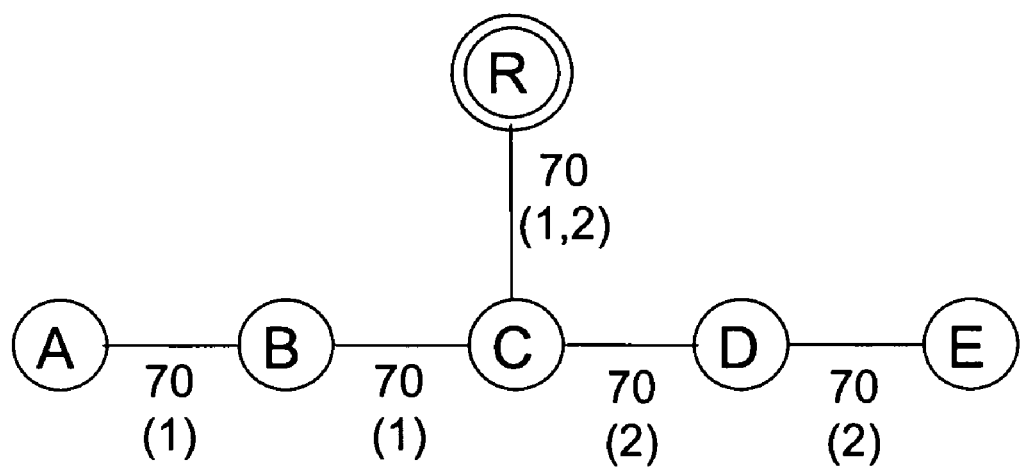

The operation of the non linear search module (block 342) will be described with regard to the example of FIG. 10, representing an optical network including five transparent nodes (A-E) and a regenerator node (R). Be $S_i$=A and $D_i$=E. In this case it is assumed that the CSPT produced by the core algorithm of block 325 does not include the destination and therefore the linear search module cannot be used to provide a solution.

As above shown, block 340 identifies the regeneration nodes (and the destination node in the next steps) to be used in searching for the solution. In the considered example, block 340 first identifies the regenerator R, included in the CSPT calculated by block 325.

Block 355 creates the logical segments along each branch of the tree. In the example, the logical segment A-R is created and stored.

Block 360 checks if every regenerator identified by block 340 has acted as a source in a calculation step made by means of the core algorithm. The exit is NO since regenerator R has not yet acted as a source.

The source is therefore updated (block 365): R becomes a temporary source for a route search between R and the destination node $D_i$=E.

After having updated the source with the node R the algorithm core (block 370) is applied to the initial topology shown in FIG. 10 with source node R and destination node E. In the example, this running of the core algorithm will produce a CSPT including the destination node E.

In the following execution of block 340, the destination node E is therefore identified. Logical segments related to the new CSPT are then created (block 355) and stored with the previous ones. Block 360 exits into block 375 as all regenerators have already acted as a source node.

Block 375 checks if at least one logical segment including the source node A and one logical segment including the destination node E exist, as the logical segments are potentially portions of the solution being searched for.

In the example under consideration, the logical segment A-R includes the source node and the logical segment R-E includes the destination node and therefore processing proceeds with block 380 that uses the logical segments identified by block 355 to construct logical paths. In particular, in the example under consideration, there is only the logical path A-R-E (block 385 and block 387).

Figure 11:
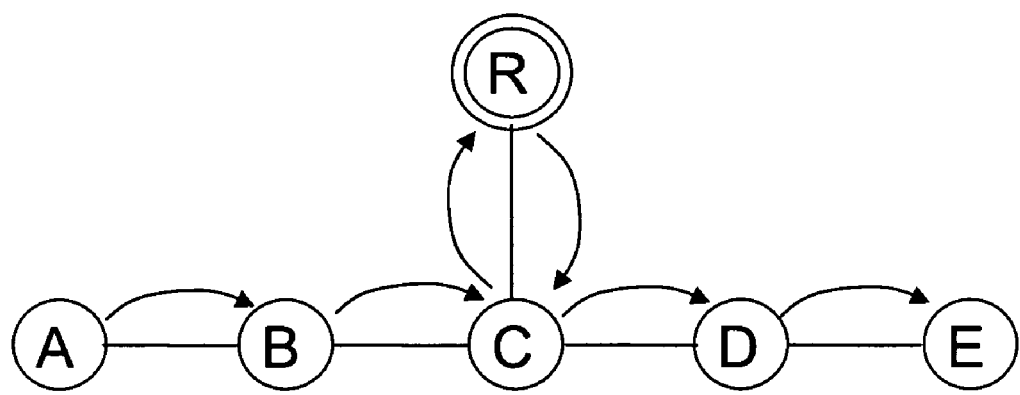
Figure 12:
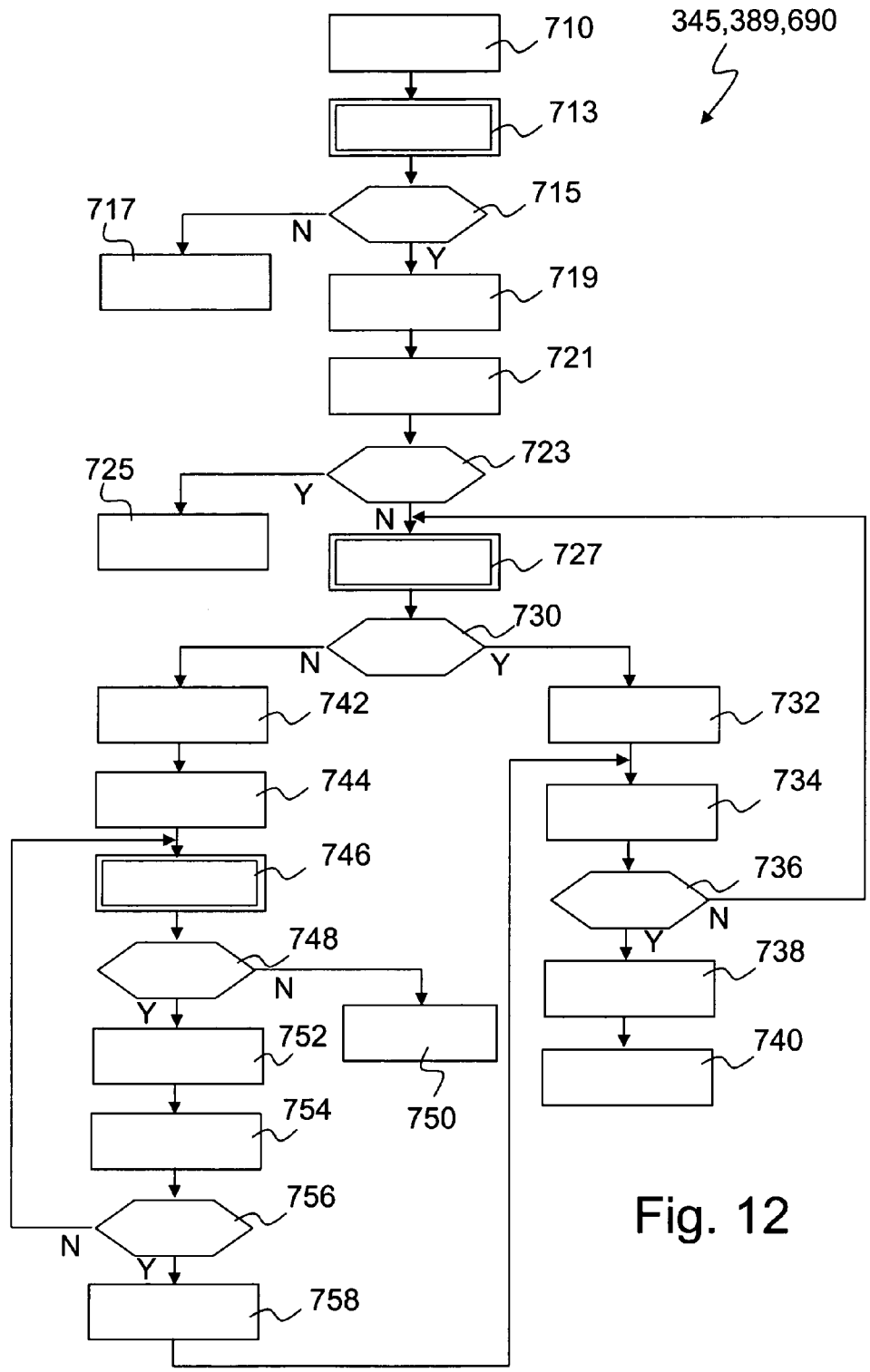

The logical path constructed in this way constitutes the input to the "Wavelength continuity check and segment optimization" function, block 389, that will output the solution shown in FIG. 11. Detailed flowchart of block 389 is shown in FIG. 12 and will be described later.

Figure 13:
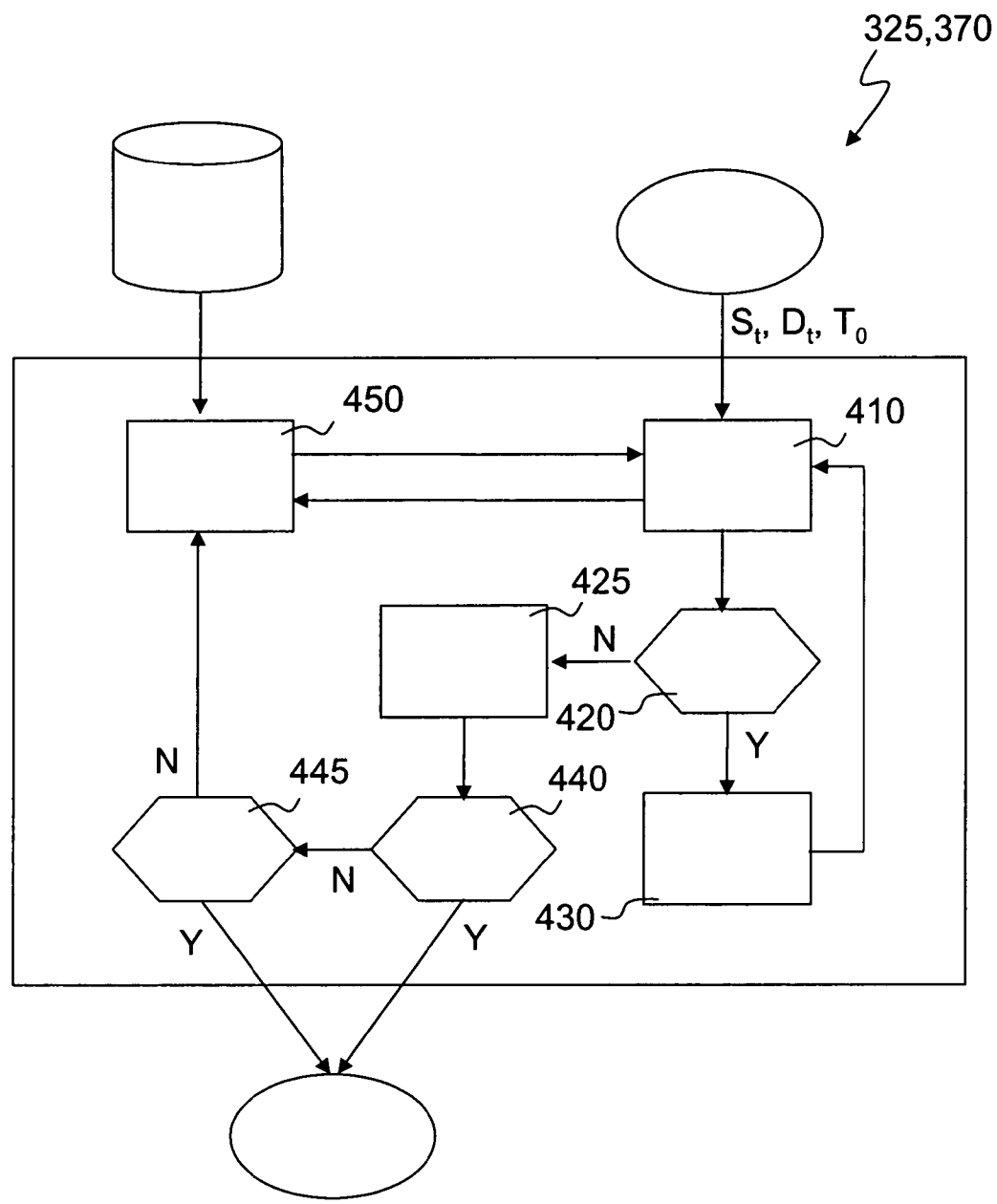

FIG. 13 represents with greater detail the core algorithm function used in blocks 325 and 370 of FIG. 9. The core algorithm receives at its input a source node $S_t$, a destination node $D_t$ and a network topology $T_0$, and outputs a CSPT. More particularly, the core algorithm function comprises a block 410 that implements a Shortest Path Algorithm (e.g. Dijkstra algorithm) constrained by a maximum accumulated effective degradation value (Constrained Shortest Path Algorithm). The partial solutions found (branches of the tree) are excluded if the effective accumulated attenuation exceeds a predetermined maximum value.

Block 410 receives at its inputs the source node $S_t$, the destination node $D_t$ and information about the network topology $T_0$. Before the first execution of the Constrained Shortest Path Algorithm algorithm, a parameter P, which may vary between 0 and 1 and whose utility will be described later, is set to 1. The output of block 410 is a CSPT along the branches of which the effective accumulated attenuation does not exceed a predetermined threshold.

Block 410 is followed by block 420 that checks if "superfluous" wavelengths exist. A wavelength is considered to be "superfluous" if it belongs to arcs (links) ending in leaves (end nodes of the tree created by block 410) that do not correspond to the destination node $D_t$ and that cannot lead to other nodes because there is no wavelength continuity nor there are any wavelength converters or regenerators available in the leave. Further details of this function are given further on.

If block 420 does not detect any "superfluous" wavelength, processing passes to block 425, otherwise (at least one superfluous wavelength is present) block 420 is followed by block 430. Block 430 performs a topology simplification by removing the wavelengths that are superfluous and updating the topology used in searching for the solution accordingly. Such superfluous wavelengths are removed since they could be sometimes detrimental, in particular they could preclude certain solutions forcing the Constrained Shortest Path Algorithm (block 410) to search for the solution along wrong paths.

Processing returns to block 410 for a new execution of the Constrained Shortest Path Algorithm using the new topology.

If there are no more "superfluous" wavelengths, block 425 updates the parameter P by decreasing it of an amount $P_0$ prefixed by the telecommunication carrier (fixed, linear, logarithmic, etc.).

Block 425 is followed by a block 440 that checks if the destination node $D_t$ has been reached, i.e. if the destination node is included along the CSPT calculated in block 410. In the affirmative, the function terminates providing the CSPT in output. It should be noted that the supplied solution is related to the topology in which the "superfluous" wavelengths (if any) have been removed and which consists of just the physically practicable paths.

If the destination node has not been reached, block 440 is followed by a block 445 that checks the actual value of P; if P≦0 (exit Y) block 445 terminates the processing operation without having identified a solution. In other words, the calculated CSPT outputted does not include the destination node $D_t$, but it can constitute the starting point for subsequent processing of non-linear solution search (blocks 342).

If the value of P is greater than 0, block 445 is followed by a block 450 that updates characterizing network parameters (e.g. block 410 use different metrics based on the P value and on other parameters detailed later on).

Moreover block 450 is queried by block 410 implementing the CSPT each time the algorithm adds a new node in the process of identifying a solution (e.g. it is the "base node" $N_i$ in the Dijstkra algorithm, that is a node along the tree for which a next hop is being evaluated) and recalculates the cost associated to each interface leaving the node in question.

The detail of function of block 410 will now be described with greater detail. According to this function a path that starts from the source node $S_r$ and tries to reach the destination node $D_t$ is created. The process tries to connect to a base node $N_i$ (initially coinciding with the source node) a new neighbouring node $N_j$. The connection is possible if three conditions (constraints) are met, i.e.:
 the overall cost from the source node $S_r$ to the new node $N_j$ is minimum with respect to other nodes that can be added to the in-building CSPT, e.g. min $\Sigma W_{i,j}$, where $W_{i,j}$ is a cost function;
 the cumulated effective degradation loss (Local Sum $LS_i$ as defined below) from the source node $S_r$ to the new node $N_j$ is less than a maximum permitted value Q; and
 wavelength continuity is assured to the new node $N_j$.

In other words, a new node $N_j$ is added to the tree if all the above mentioned constraints are met. If these constraints are not satisfied, then the considered path of the tree that includes the new node $N_j$ is interrupted.

The cost function $W_{i,j}$ is calculated according to the following expression that takes into account both the available resources and the signal's accumulated degradation.

In particular, utilized metrics are defined as follows:

$$W_{i,j} = \begin{cases} I_i + (P \times C_i) + \left[\left(1 - \frac{b_{i,j}}{B}\right) \times \left(1 - \frac{r_j}{R_j}\right)\right] \times \alpha_{i,j} & (1) \\ \quad \text{if } \frac{LS_i}{Q} < P \text{ or } D_{i,j} > Q - LS_i \\ I_i + (P \times C_i) + \left[\left(1 - \frac{b_{i,j}}{B}\right) \times \left(1 - \frac{r_j}{R_j}\right)\right] \times \left(1 - \frac{LS_i}{Q}\right) \times \alpha_{i,j} & (2) \\ \quad \text{if } \frac{LS_i}{Q} \geq P \,\&\, D_{i,j} \leq Q - LS_i \end{cases}$$

where:
Wi,j Cost of link from node $N_i$ to node $N_j$, where $N_i$ is the base node and $N_j$ is the new neighbouring node to be added;
$I_i$ Effective attenuation associated with traversing the base node $N_i$;
P is the parameter above described (block 425) that ranges from 0 to 1 (starts with 1 and is decremented at each loop);
$C_i$ Effective attenuation associated with the use of a wavelength converter. This parameter sums up all degradation introduced by a wavelength converter. If there is wavelength continuity, then C=0;
$b_{i,j}$ Number of available wavelengths on the link between node $N_i$ and node $N_j$;
$B_{i,j}$ Total number of wavelengths on the link between node $N_i$ and node $N_j$;
$r_j$ Number of available regenerators on node $N_j$;
$R_j$ Total number of regenerators on node $N_j$; if $R_j$=0 then $r_j/R_j$ is zeroed.
$LS_i$ Effective attenuation accumulated along a given route from the source node to node $N_i$ (hereafter $LS_i$ will be referred as Local Sum);
Q Maximum effective attenuation that an optical signal can undergo without information loss;
$\alpha_{i,j}$ Effective attenuation along the link between nodes $N_i$ and $N_j$; and
$D_{i,j}$ Effective Distance, i.e. effective attenuation along the shortest route from link $N_i$-$N_j$ to the nearest regenerator. It is a value associated with a single interface and is only associated with those links for which a feasible shortest path to a regenerator exists ($D_{i,j}$ is less or equal to Q).

Accordingly the cost $W_{i,j}$ depends, inter alia, on the value of parameter P, which is modified (see FIG. 13) at each iteration (which comprises blocks 410, 420, 425, 440, 445 and 450) of the above described process. The cost also depends on the status of the base node $N_i$ at that time and the available resources on the neighbouring new node $N_j$(next hop).

The Local Sum $LS_i$ describes the effective accumulated degradation of a given optical path from the source node up to the base node $N_i$, and has been introduced in order to take into account the physical constraints present in a transparent optical network and to determine the feasibility of a given optical path. The Local Sum $LS_i$ associated with a branch of the shortest-path tree is zeroed if a regeneration node is added along that branch during the determination of the path. In this phase of path search, the utilization of regeneration resources is assumed, but without performing the actual assignment, which will take place in a dedicated function (second phase of the proposed method).

The Local Sum $LS_i$ also affects the calculation of the cost $W_{i,j}$, as appears from expressions (1) and (2) and then the route search. In more detail, in the case where the $LS_i$ is relatively low (in particular, when it is less than a limit value) the cost function $W_{i,j}$ is calculated under expression (1), which favours the less-used routes, that is links with greater wavelength availability and nodes with a larger number of regeneration resources.

A significant $LS_i$ (i.e. greater than a limit value), due for example to a long distance between source and destination $D_t$ or to network load condition (e.g. congestion), may force the algorithm to search for longer routes. In these cases, the cost function $W_{i,j}$ is calculated under expression (2), which favours the use of links for which the possibility of reaching a regeneration node is known in advance (because the $D_{i,j}$ Effective Distance parameter has been defined for them) without exceeding the maximum allowed value for $LS_i$. In this case, the cost function favours the convergence of the partial solution towards a regeneration node where the signal levels can be restored. If the Effective Distance vector $D_{i,j}$ elements are not defined then equation (1) must be used.

The wavelength continuity (third condition) is verified by means of the so called Continuity Vector. The Continuity Vector is a vector whose elements are the wavelengths for which continuity exists starting from the root node (source $S_r$) up to the base node $N_i$ or for which continuity can be guaranteed via the use of wavelength converters or regenerators. If a base node $N_i$ is provided with conversion/regeneration resources, wavelength continuity towards the new neighbouring node $N_j$ (next hop) is guaranteed. In this case, the Continuity Vector associated with the neighbouring node $N_j$ will contain all the wavelengths available on the link leaving the base node $N_i$.

If the base node $N_i$ does not have conversion/regeneration resources, the following two cases can be distinguished:

a) none of the wavelengths present in the Continuity Vector is available on the link towards the neighbouring node $N_j$. Wavelength continuity cannot be assured on the link taken into account, which must therefore be discarded;

b) at least one of the wavelengths present in the Continuity Vector is available on the link to the neighbouring node. In this case continuity is assured between the base node $N_i$ and the neighbouring node N. The Continuity Vector associated with the neighbouring node $N_j$ will contain wavelengths common to the base node's Continuity Vector and the traversed link.

Figure 14:
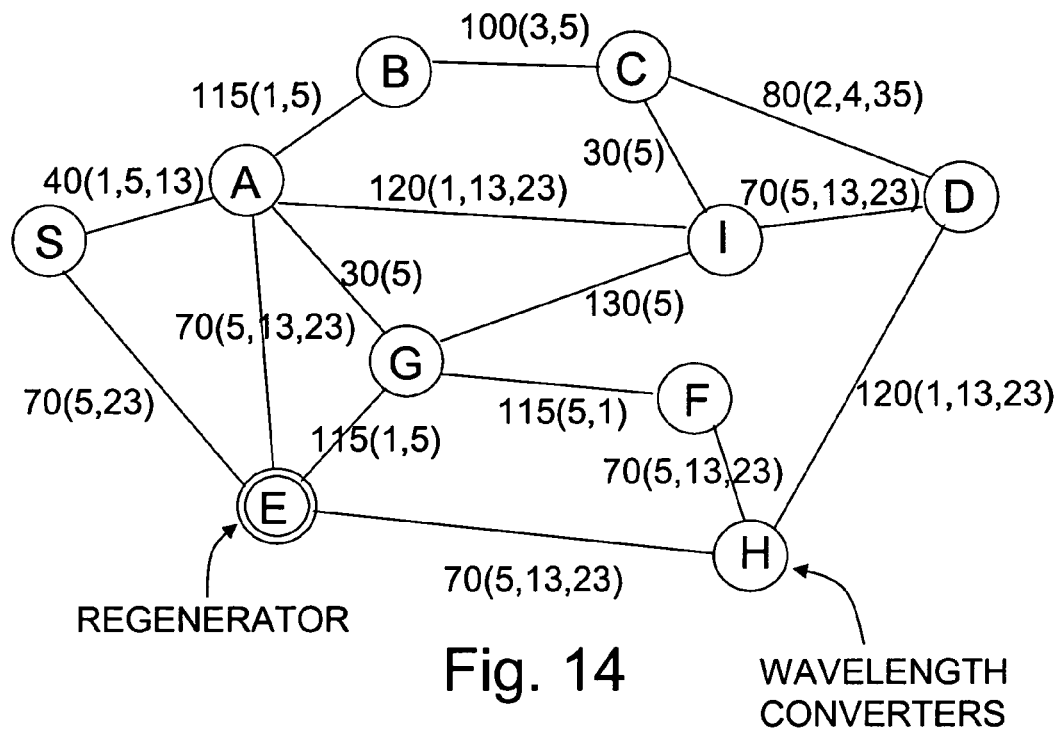

By way of example, the above described function is applied to the network shown in FIG. 14, where it is assumed that:

node E has one regenerator available, and no other nodes have regenerators available;

node H has two wavelength converters available, and no other node has wavelength converters available; and for each link, the first number describes the effective attenuation $\alpha_{i,j}$ along the link while the numbers in parentheses represent a vector of the wavelengths available along the links. For example, on link E-H: 70 represents the effective attenuation, 5 represents the availability of the fifth wavelength of the set of wavelengths available on the WDM system, etc.

Let S be the source node, C the destination node, Q=235 and for simplicity $C_i$=0 and $I_i$=0, $B_{i,j}$=5. Moreover, $R_E$=1, since there is only one regenerator in node E. Metric units depend on the particular implementation adopted for the metric cost.

Figure 15:
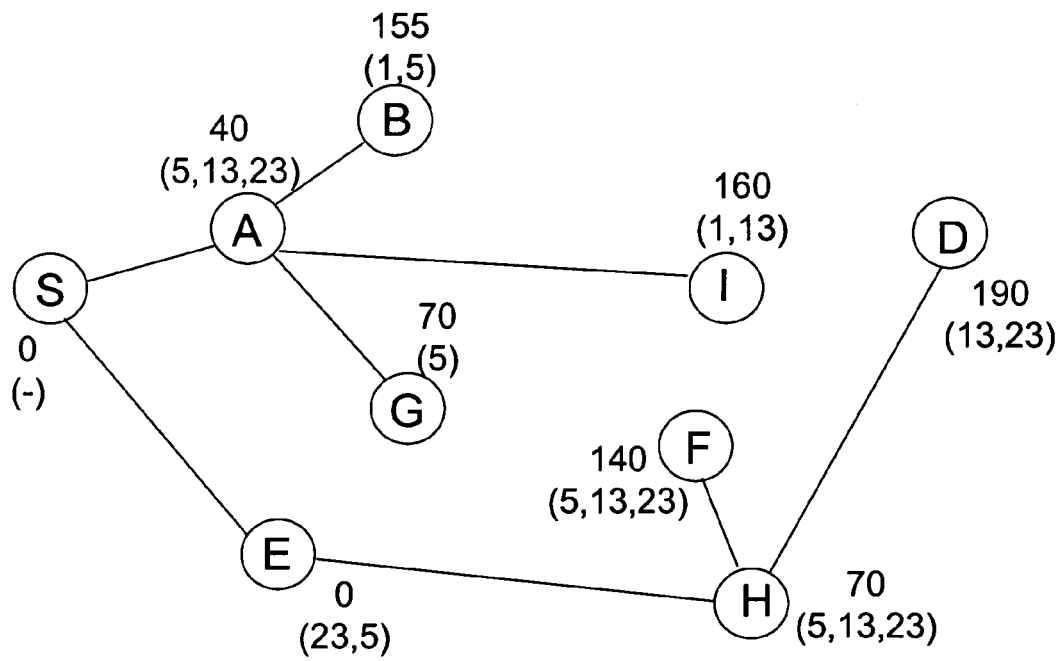

The CSPT is shown in FIG. 15, indicating for each node the effective attenuation $LS_i$ accumulated at each node and, in brackets, the Continuity Vector. It can be noted that the $LS_i$ value at node E is null due to the effect of that node's regeneration capability. FIG. 15 highlights the impossibility of reaching the destination C. For example $LS_i$ is greater than Q along the S-A-B-C path, while wavelength continuity is not assured along the S-A-I-C path.

The following example will clarify the meaning of the parameter $D_{i,j}$ (Effective Distance) used in the above equation. As already stated the Effective Distance $D_{i,j}$ represents the effective attenuation that an optical signal undergoes during its propagation from a given node's interface up to the nearest regeneration node.

Figure 16:
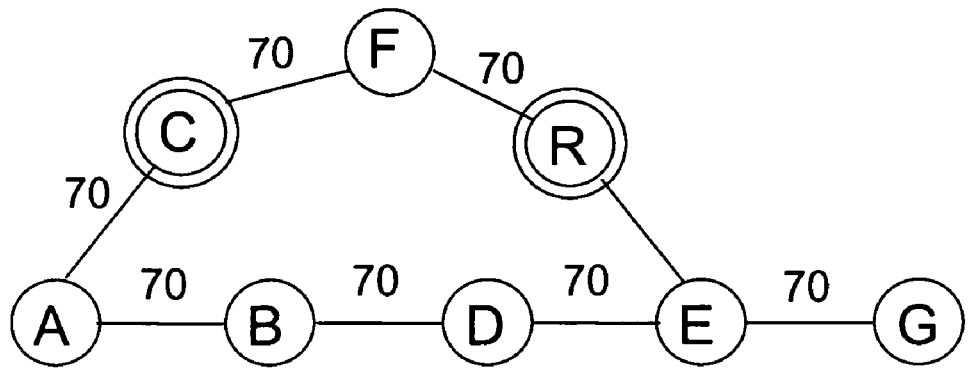
Figure 17A:
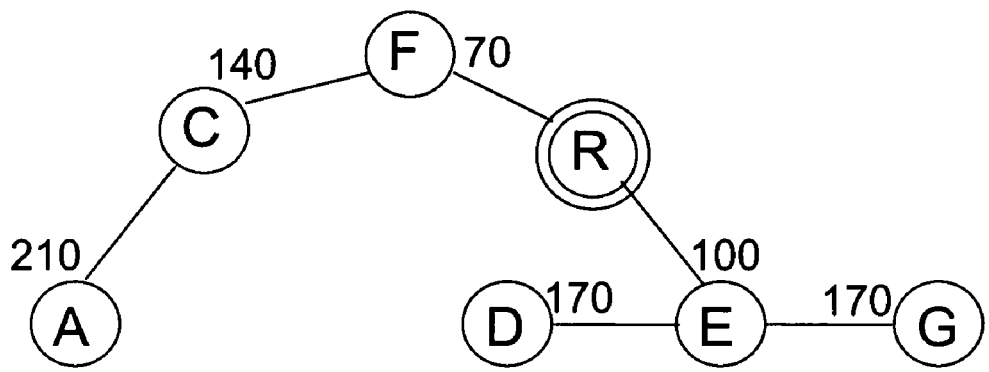
Figure 17B:
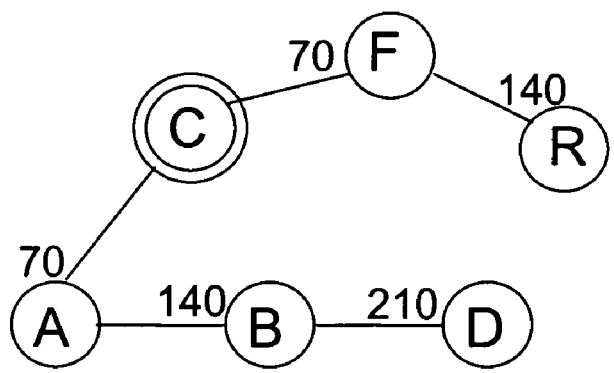

Let consider the example provided in FIG. 16, showing a graph with eight nodes. In the example, nodes R and C have regeneration capabilities while the other ones are transparent optical nodes. The values associated with the arcs (links) represent the effective attenuation and a maximum effective attenuation of Q=235 is assumed. FIGS. 17a and 17b show the two CSPTs associated to the graph of FIG. 16 and having node R and C as source nodes.

It should be noted that the CSPT do not cover all nodes due to the constraint imposed by the effective attenuation (Q=235). FIGS. 17a and 17b also shows the attenuation values along the branches of the shortest-path trees, i.e. the Effective Distances of each node to the regenerators. The Effective Distances are relative to the interfaces of each node.

It follows for example that it is possible for example to associate an Effective Distance (towards regeneration node R) to the interface on node D along link D-B, but not to the interface on node B along link B-D. Other interfaces are instead characterized by two values as it is possible to reach both regenerators from them along the shortest-path trees. For example, the interface on node A along link A-C has an Effective Distance of 210 from regenerator R and 70 from regenerator C.

Figure 18:
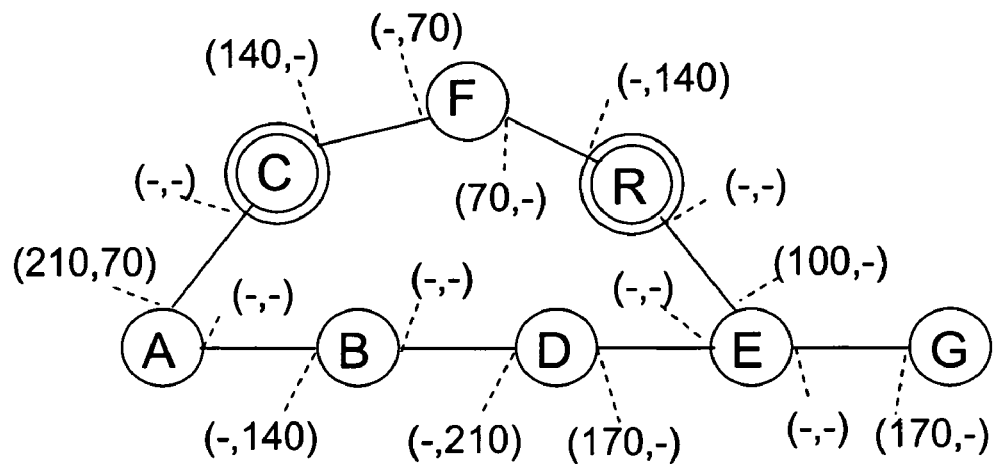

The Effective Distance vectors associated with the different interfaces of the topology in FIG. 16 are summarized in FIG. 18. The first element of the vector represents the Effective Distance to R and the second to C.

The Effective Distance $D_{i,j}$ parameter influences the metrics as expression (2) can only be used for interfaces on which this parameter is defined.

To favour the search for an optimal solution, if the CSPT reaches a node with available regeneration resources during execution of the Constrained Shortest Path Algorithm function (FIG. 13, Block 410), then the Effective Distances $D_{i,j}$ associated with that regenerator are excluded from subsequent routing decisions. When execution of the Constrained Shortest Path Algorithm function terminates, the excluded $D_{i,j}$ values are integrated again in the information useful for routing purposes in the function of block 425 (FIG. 13) (update of P parameter and load of initial topology) for next iterations.

In the following the function of block 430 will be described with greater detail. The purpose of the block 430 is to simplify the topology subjected to the routing process by excluding network resources (especially wavelengths) that are considered inadequate from the route search.

More specifically, block 430 excludes the wavelengths of the Continuity Vector associated to an end node (leaf node) of the CSPT calculated by block 410 that has no regeneration and/or conversion resources and that satisfy certain conditions. In other to exclude wavelengths at least one of the following conditions must be verified:

1. the intersection of the set of wavelengths of the Continuity Vector with each set of available wavelengths on the interfaces leaving the leaf node is the empty set; or 2. the intersection between the set of wavelengths of the Continuity Vector and the wavelengths available on an interface leaving the leaf node is a non-null set but only towards neighbouring nodes that are already part of the path to which the leaf node belongs (loop condition); or 3. the leaf node only has the interface from which it was reached (or rather, there isn't any link leaving the leaf node).

In other words, it is checked, for each end node that has no wavelength conversion resources and for each wavelength of the corresponding set of wavelengths, if the end node is connected to at least another node external the corresponding branch through said wavelength.

Figure 1:
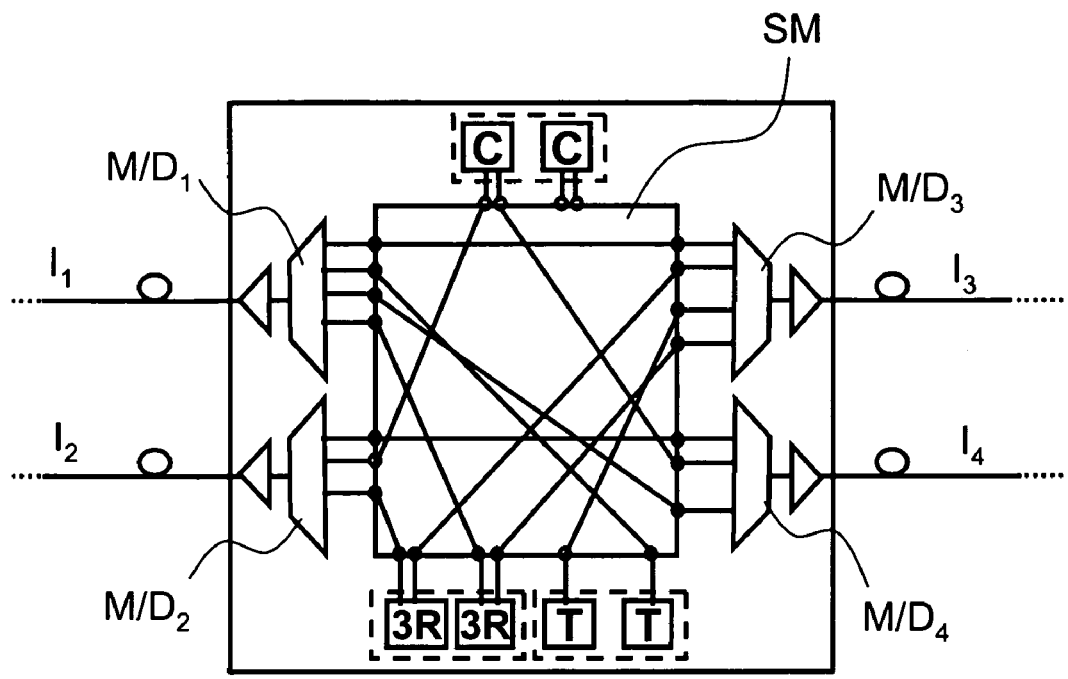
FIG. 1 is an example of network node architecture.
Figure 2:
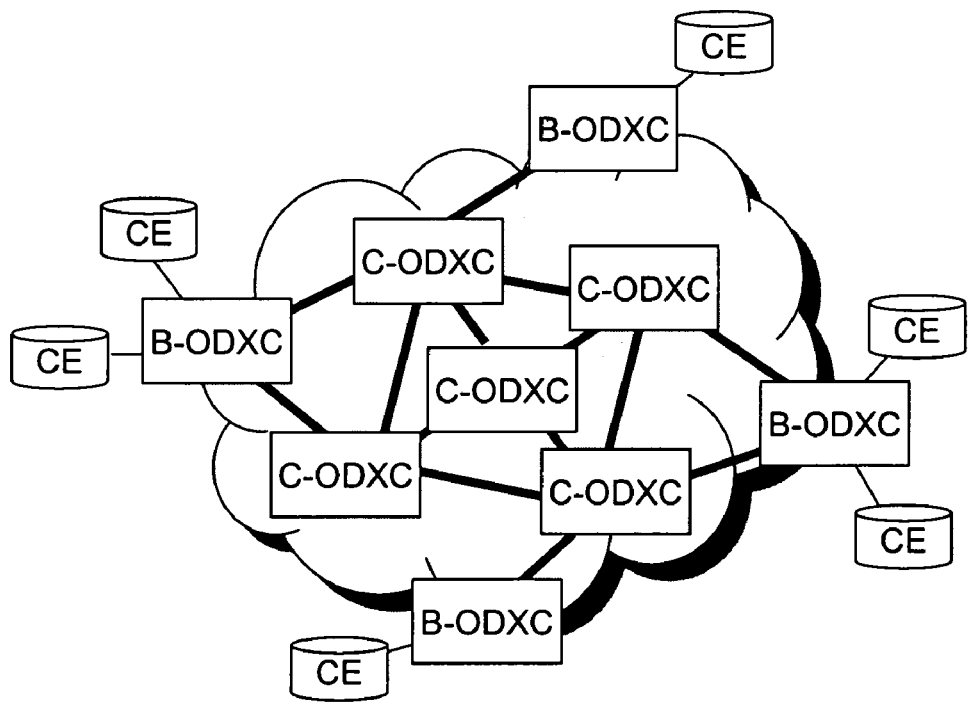
FIG. 2 is an example of translucent network.
Figure 3:
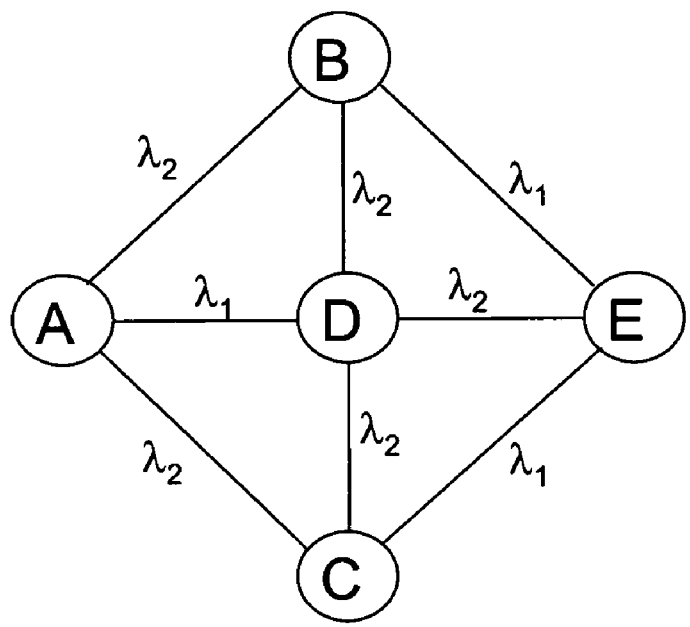
FIGS. 3-7, 10, 11, 14-24, 26-28 and 30-34 are examples of network topologies and of routing methods applied to such network topologies.
Figure 4:
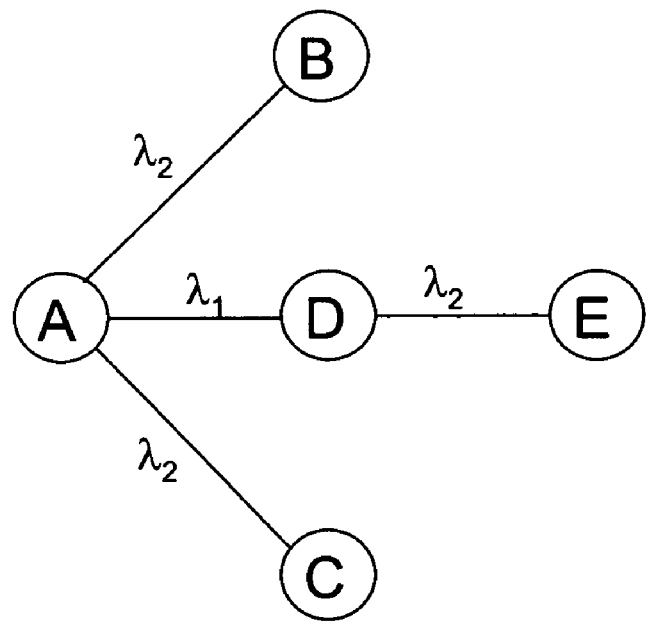
Figure 5:
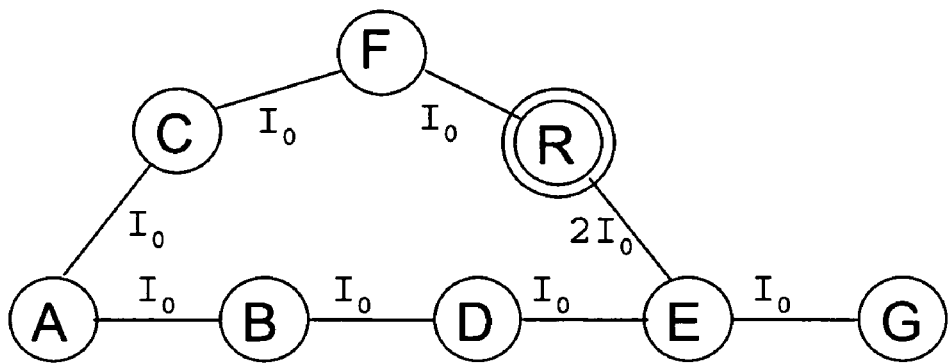
Figure 6:
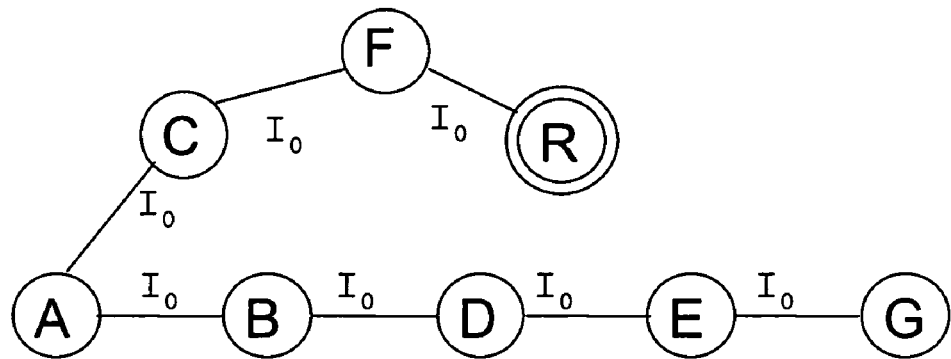
Figure 7:
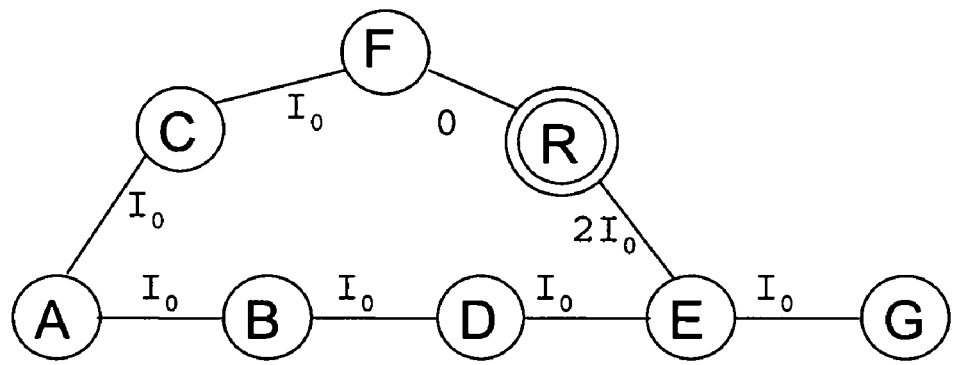

The above conditions will be clarified in the following example that is explained with reference again to FIG. 3 showing a network with five nodes. In the example, without loss of generality, it is assumed to have the same effective attenuation on all the links connecting the nodes and that for an arbitrary path between two generic nodes the Local Sum is less than the maximum effective attenuation (that is the entire network constitutes a transparency domain). It is also assumed that all of the nodes are pure transparent nodes (i.e. they do not have regeneration and wavelength conversion capabilities). With these assumptions, the weights associated with the interfaces are all the same.

Figure 19:
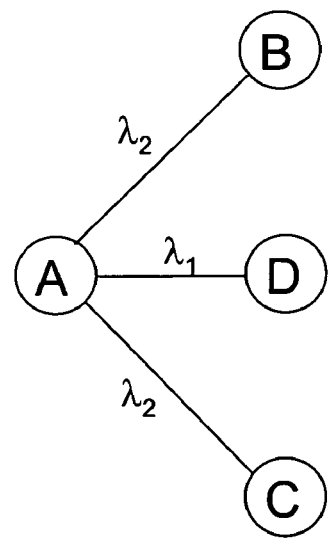

Let A be the source node and E the destination node. Applying the Constrained Shortest Path Algorithm (e.g. Dijkstra) to the topology under consideration gives the CSPT shown in FIG. 19. Accordingly, the nodes B, D and C are leaves of the CSPT because they are end nodes of the tree.

None of them is provided with regeneration and conversion resources. The topological simplification function of block 430 determines that it is not possible to remove wavelength λ2 of the Continuity Vector associated with the leaf node B because its intersection with the vector of the wavelengths associated with link B-D is not null (or rather, composed of λ2) and terminates on a node (D) that is not part of the original path (or rather, it is not the case of a loop).

The same considerations apply to leaf node C.

However, it is possible to remove wavelength λ1 of the Continuity Vector associated to node D because it satisfies the first condition.

A summary of the above is provided in the enclosed table.

| Condition | Node B | Node C | Node D |
|---|---|---|---|
| 1 | False | False | True |
| 2 | False | False | False |
| 3 | False | False | False |

Figure 20:
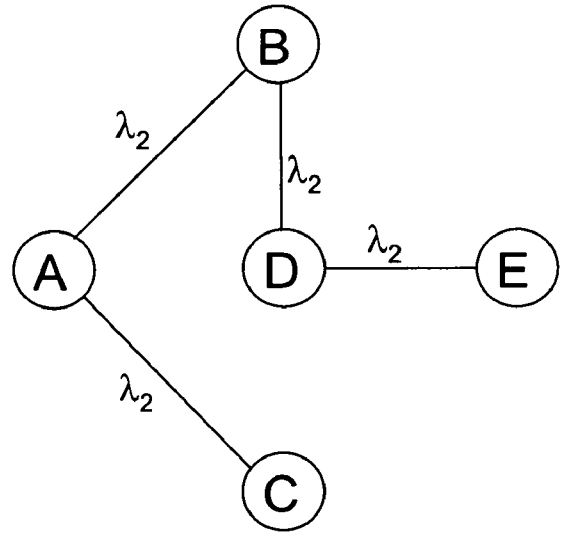

The topology is thus updated excluding wavelength λ1 on link AD and the Constrained Shortest Path Algorithm is applied again. The new iteration produces the CSPT shown in FIG. 20 in which the destination is reached via the path A-B-D-E.

As previously stated, the variable P allows the behaviour of the routing algorithm to be modified according to the number of failed attempts in searching for a route to the destination, effectively enabling the more or less intensive use of regeneration and/or conversion resources. Block 410 gradually favours the usage of valuable network resources (i.e. regeneration and conversion resources) as the number of failed attempts increase. To this aim, the P parameter is decremented at each iteration (block 425) of the Constrained Shortest Path Algorithm and topological simplification functions.

Figure 21:
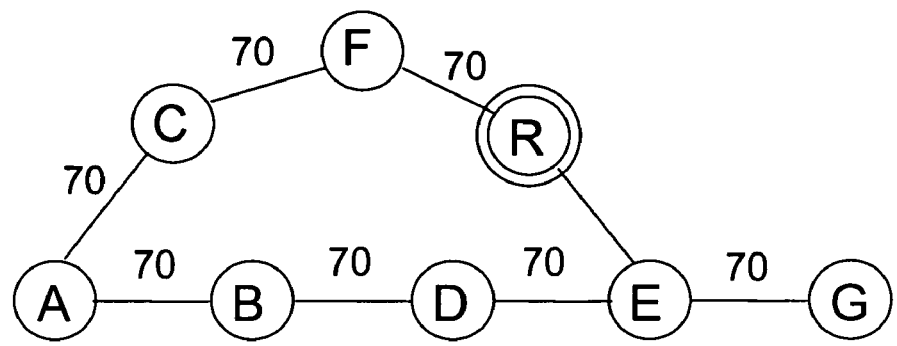
Figure 22:
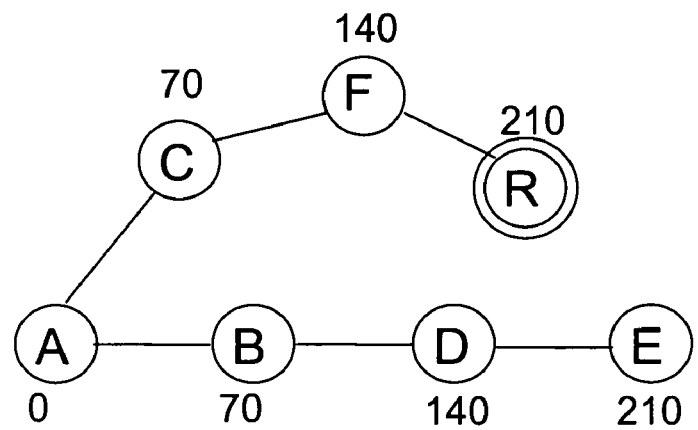

A related example is shown in FIG. 21 where node A is the source node, node G the destination node and node R is a regeneration node. In this example, it is assumed that the wavelength continuity is assured and that each link has the same wavelength availability. It is also assumed that the parameters of the cost function have the following values:
$l_i = C_i = 0$
$r_j = 2$ for node R
$R = 7$
$Q = 210$
$b_{i,j} = 4$
$B_{i,j} = 10$ Based on the above assumptions, in the first iteration the Constrained Shortest Path Algorithm of block 410 outputs the CSPT shown in FIG. 22, where the total cost of the Local Sum values are indicated next to each node. The source is not able to reach the destination because the constraint of maximum degradation is not respected. In fact in FIG. 22 the destination node G is not included in the CSPT.

After having calculated the above, the process skips from block 410 to the check block 420 of FIG. 13. With the above assumptions, no wavelength is superfluous as wavelength continuity is guaranteed by assumption, and therefore processing passes to block 425 to update the "P" parameter and load initial topology. In this phase, the P parameter is decremented by a certain amount $P_0$ (which can be a constant value or an arbitrary function) and block 410 is reselected to execute again the Constrained Shortest Path Algorithm, since the exit of check block 440 is NO, as well as that of block 445.

The iterative process just described is repeated until the decreased P parameter value enables equation cost (2) for the F-R link. A lower cost is given to this link with respect to that assigned in the previous iterations.

Figure 23:
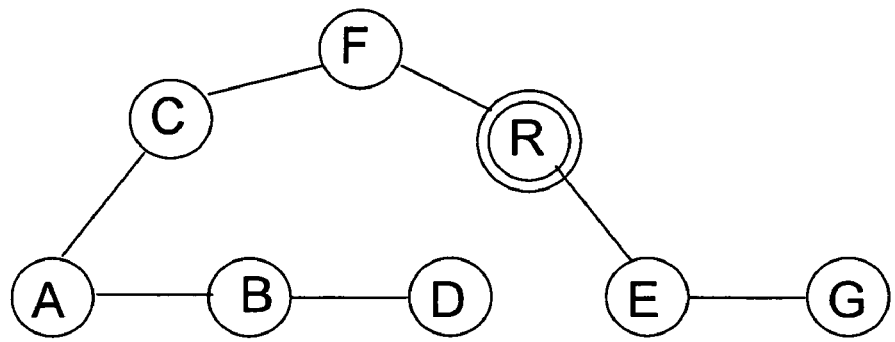

Instead, the values of the weights associated with the other links remain tied to cost function of equation (1). Block 410 outputs the CSPT shown in FIG. 23 where it is possible to notice that a path is found between source and destination, along the route A-C-F-R-E-G. The Local Sum is within the permitted limits because the use of the regeneration function on node R allows it to be zeroed. The P parameter has therefore gradually modified the routing, enabling the use of the regeneration resources available on the network.

The algorithm core function of block 325 (FIG. 9) outputs a CSPT that satisfies the constraints of transparency imposed by the network. Nevertheless, because the above procedure is based on an additive algorithm (i.e. it gives the network topology an unequivocal orientation, traversing each link only once), it is not possible to find those solutions that contemplate sharing the same link (e.g. allocating different wavelengths), such as when the regeneration function is utilized, for example.

To clarify this concept, the network shown in FIG. 10 is considered again. The wavelengths available on the links are represented by vectors (in brackets, e.g. (1,2)), while the other value associated to each link represents the effective attenuation. It is assumed that Q=220.

Figure 24:
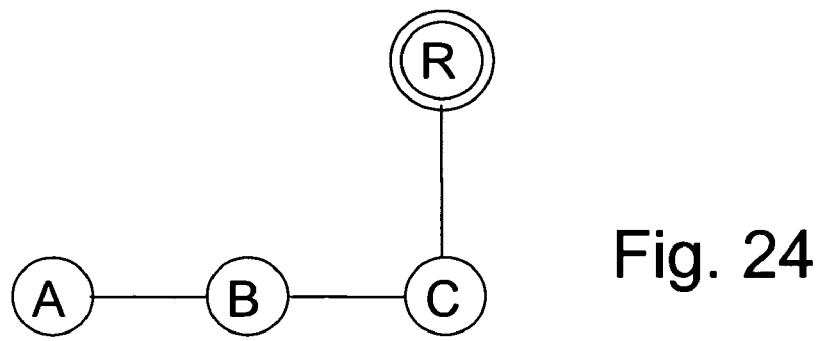

Let A be the source node and E the destination node. The algorithm core function (block 325) produces in output the CSPT shown in FIG. 24. The procedure does not allow the destination node E to be reached for the following reasons:
along the path A-B-C-D-E there is no wavelength continuity on link CD and node C does not have available conversion resources;
even if wavelength continuity was verified, the Local Sum along the path A-B-C-D-E would be greater than Q.

However, a route that respects the physical constraints exists and it is highlighted in FIG. 11, where node R allows the Local Sum (or rather, the effective accumulated attenuation) to be zeroed and to convert the wavelength from $\lambda_1$ to $\lambda_2$.

The algorithm core function is not able to find solutions of this type because the Constrained Shortest Path Algorithm of block 325 does not allow the same link to be traversed twice.

The Non-linear Search module 342 has been introduced for the purpose of remedying this problem, the module allowing these limitations to be overcome through the introduction of logical segments and logical paths.

Figure 25:
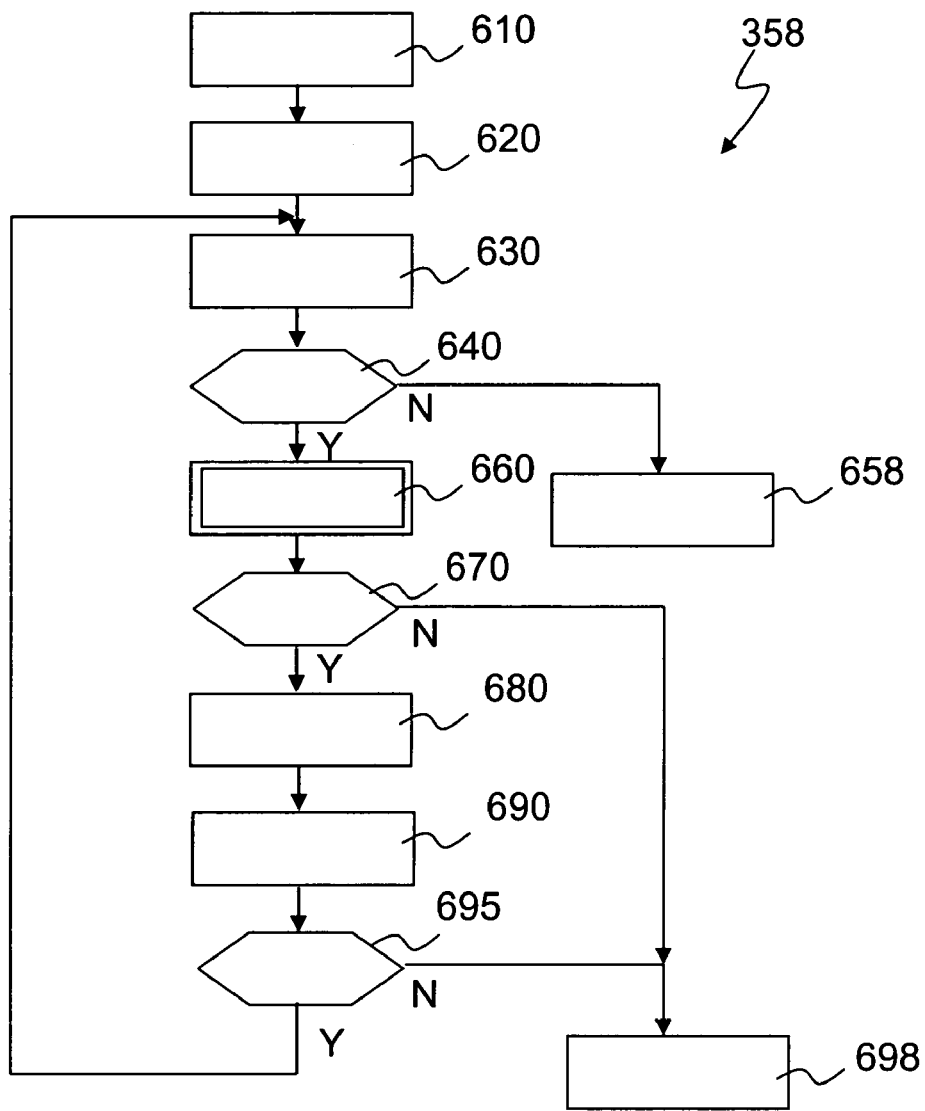

The "Wavelength continuity check and segment optimization" procedure (block 345 and block 389 of FIG. 9 and block 690 of FIG. 25 described later) is described in more details in FIG. 12. The procedure comprises a block 710 where the logical path is stored. During the procedure the source and destination nodes may vary so in the following they are called temporary source node $S_a$ and temporary destination node $D_a$. Initially $S_a = S_i$ and $D_a$ is set to the second node of the logical path. In the example of FIG. 10 $D_a = R$. The initial topology is also considered at this phase. This information is passed in input to block 713 implementing again the core algorithm (same functionality already described for block 325, FIG. 9).

Block 713 applies the core algorithm on the topology and with the source and destination nodes as defined in the previous step 710, and produces at its output the CSPT.

Block 713 is followed by a block 715 that checks if the temporary destination is included in the CSPT; in the affirmative block 715 is followed by block 719, otherwise it is followed by block 717 that highlights a possible error in the procedure.

Block 719 identifies the branch of the shortest-path tree that reaches the temporary destination. If along this branch there are one or more links with just one wavelength allowing signal propagation, then it is necessary to remove the availability of the other wavelengths from those links or sequences of links where it is not possible to set aside that wavelength for signal propagation.

More in detail:

a) if the branch of the tree under consideration does not have wavelength converters and the wavelength continuity is assured by only one wavelength, then it is necessary to remove it along the entire length of the branch;

b) if the branch of the tree under consideration has wavelength converters or regenerators, then each link having just one wavelength is considered and processing proceeds as follows:

Starting from each link under consideration, progress is made upstream up to where wavelength continuity is assured in a transparent manner. The first node upstream with regeneration or wavelength conversion capabilities, or the source node, is considered to be the head-end of a transparent segment. The network topology is updated removing the selected wavelengths along each transparent segment previously identified;

similarly, progress is made downstream while wavelength continuity is assured in a transparent manner. The first downstream node with regeneration or wavelength conversion capabilities, or the destination node, is considered to be the tail-end of a transparent segment. The network topology is updated removing the selected wavelengths along each transparent segment previously identified;

finally, the logical segment (temporary source, transparent nodes and temporary destination) is stored.

Block 719 is followed by a block 721 that updates the temporary source and destination nodes. In particular, the new temporary source takes the place of the old temporary destination $S_a=D_a$, while the new temporary destination becomes the first downstream node on the logical path with respect to the new source considered. Block 721 is followed by a block 723 that checks if the temporary source coincides with the actual destination $S_a=D_i$; in the affirmative block 725 is selected that outputs the searched path that consist of a single segment including both the source node $S_i$ and the destination node $D_i$. In the negative, the algorithm selects block 727 providing the updated topology, the new source node $S_a$ and the new destination node $D_a$ in input to the core algorithm. Block 727 performs the same actions as block 713 outputting a CSPT.

Block 727 is followed by block 730 that checks if the temporary destination is included in the CSPT; in the affirmative block 730 is followed by block 732, otherwise it is followed by block 742.

Block 732 performs the same actions as block 719 and it is followed by block 734 that updates the temporary source and destination nodes in the same way block 721 does. Block 734 is followed by block 736 that checks if temporary source node coincides with the initial destination node ($S_a=D_i$) and in the negative it returns to block 727. In the affirmative, block 736 is followed by block 738 that concatenates the segments stored in the previous steps to obtain the path being searched for that represents the output of block 740.

Coming back to block 742 (reached through exit NO from block 730), this block stores the source node ($S_x=S_a$) and the destination node ($D_x=D_a$) used in the last search.

Block 742 is followed by a block 744 that loads the initial topology that is inclusive of all resources (wavelengths and converters) prior to the simplification applied in block 719 and block 732.

Block 744 is followed by a block 746 where the algorithm core is applied again, using the source and destination stored in block 742 and the initial topology. It outputs a logical path.

Block 746 is followed by a block 748 that checks if the temporary destination is reached. In the negative the logical path under consideration does not have a solution (i.e. it is not possible to obtain a physical path with wavelength continuity starting from the logical path considered, block 750).

If the temporary destination has been reached, block 748 is followed by block 752 that performs the same operations of block 732. Block 752 is followed by a block 754 that updates the temporary source and temporary destination nodes. In particular, the new temporary destination coincides with the old temporary source, while the new temporary source becomes the upstream node, if it exists, on the logical path with respect to the new temporary destination considered.

Block 754 is followed by block 756 that checks if the temporary destination and the actual source coincide ($D_a=S_i$) and, in the negative, shifts back the process to block 746.

If the temporary destination and the actual source coincide, then processing passes to a block 758 where the temporary source and destination identifiers stored in block 742 are loaded and processing returns to block 734.

In order to clarify what above explained, let us consider again the topology of FIG. 10, where A is the source and E the destination.

The corresponding logical path found by non linear search (block 342) for this topology is A-R-E. The non-linear search includes the "Wavelength continuity check and segment optimization" block that is detailed below:

block 710: the temporary source is set as the actual source of the request, i.e. $S_a=A$, and the temporary destination is set as the first downstream node along the logical path, i.e. $D_a=R$;

block 713: the algorithm core is applied to the initial topology with temporary source A and temporary destination R, producing the CSPT in output;

block 715: the exit is YES since the temporary destination R is reached and therefore processing proceeds to block 719;

block 719: the availability of wavelength $\lambda 1$ (that is the only wavelength along at least one branch) is removed from links A-B, B-C and C-R and the topology updated accordingly; segment A-B-C-R is stored;

block 721: the new temporary source becomes $S_a=R$, the new temporary destination becomes node $D_a=E$ (coincident with the actual destination) and the topology utilized is the one updated in block 719;

block 723: the temporary source (node R) and the actual destination (node E) do not coincide and therefore processing proceeds to block 727;

block 727: the core algorithm is applied, with temporary source R, temporary destination E and with the topology updated in block 719, producing a CSPT in output;

block 730: the exit is YES since the temporary destination E is reached and therefore processing proceeds to block 732;

block 732: the availability of wavelength $\lambda 2$ (that is the only wavelength along at least one branch) is removed from links R-C, C-D and D-E and the topology updated accordingly; segment R-C-D-E is stored;

block 734: the new temporary source becomes $S_a$=E, while the temporary destination cannot be updated since E was the last node of the path;

block 736: the temporary source coincides ($S_a$) with the actual destination (node E) and therefore processing passes to block 738;

block 738: the segments stored in the previous steps are concatenated to obtain the path being searched for (see FIG. 11).

The described function is called "Wavelength continuity check and segment optimization" because it not only allows the feasibility of a path to be checked, but it also improves the path itself by improving routing along each segment the entire path is made of.

Figure 26:
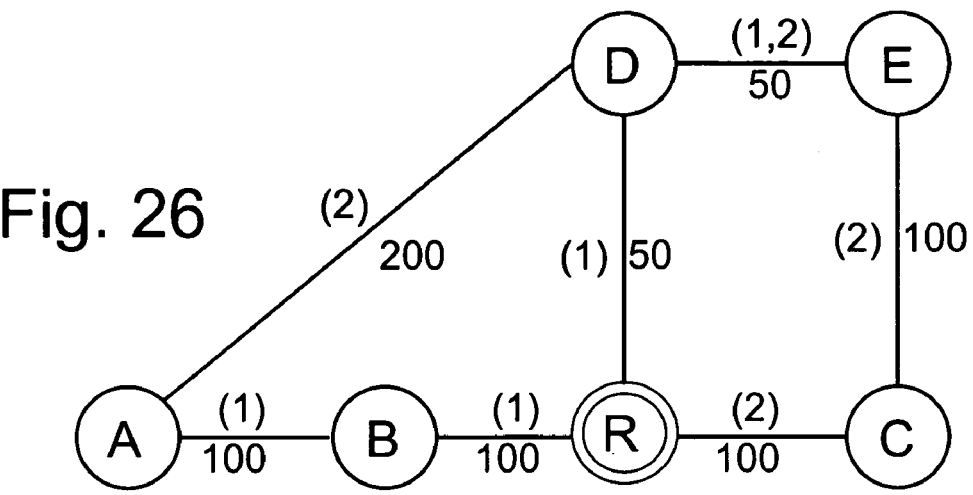

The advantages provided by the "Wavelength continuity check and segment optimization" function are further highlighted by means of the following example, referring to the network topology of FIG. 26. The wavelengths available on the links are represented by vectors (in brackets, e.g. (1,2)), while the other value associated to each link represents the effective attenuation.

Figure 27:
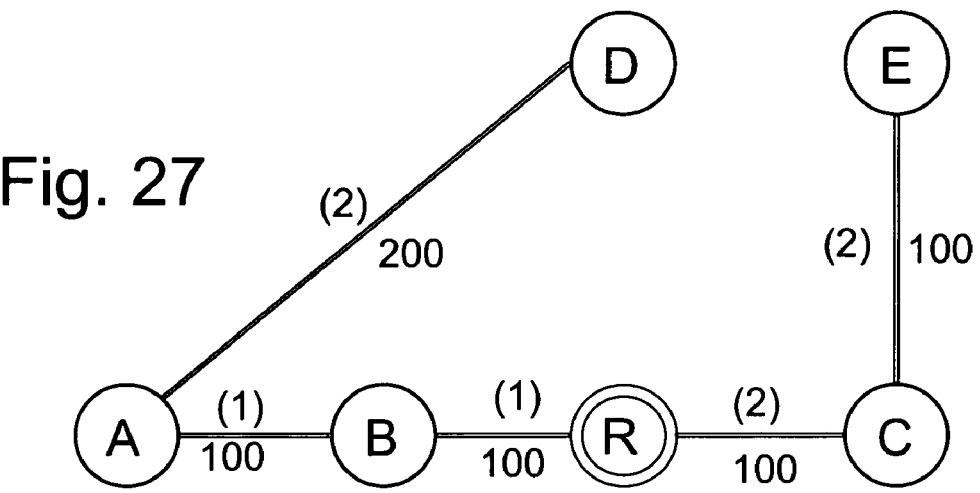

Let's assume that there is a routing request from node A to node E. The core algorithm 325 of FIG. 9 is applied, so as to seek a linear solution of the routing problem. The output of the core algorithm 325 is the CSPT shown in FIG. 27. The destination is reached at the first running of the core algorithm though path A-B-R-C-E, so there is no need to adjust the parameter P.

However, there is a feasible path at a lower cost that has not been found by the algorithm: the path A-B-R-D-E. This path was not found because node D was reached from source A before node R became a base node in the algorithm. The method of the present invention allows detecting this path.

Figure 28:
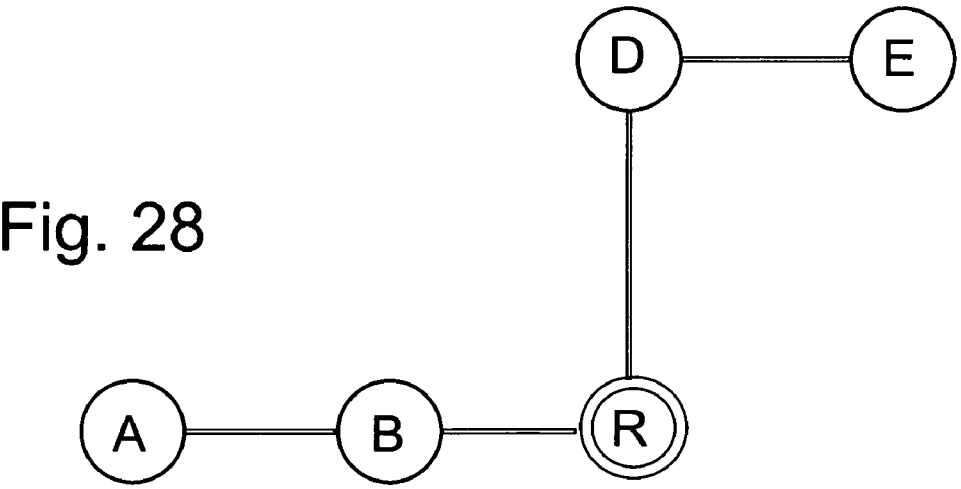

The solution detected by the core algorithm (A-B-R-C-E) is optimized by feeding the associated logical path A-R-E to the "Wavelength continuity check and segment optimization" module (block 345, FIG. 9) that, as previously described, applies the core algorithm to source node A and destination node R and then to source node R and destination node E. The solution A-B-R-D-E shown in FIG. 28 is obtained at the first running and represents the "base solution". A further optional improvement can be obtained by applying block 358 of FIG. 9. It is described in detail in FIG. 25 and the result is a potentially improved solution called "Advanced solution". The method foresees a block 610 to store the source node $S_i$ as part of the "Advanced solution" and to load the temporary source node $S_t$ to the $S_i$ value, i.e. node A (block 620). Block 630 stores the node adjacent the source node A (i.e. node B) in the "base solution" previously found, as part of the "Advanced solution". Moreover temporary source $S_t$ is updated with the node next to its value (i.e. node B) and then used for a first running of the algorithm.

Block 640 checks if the temporary source node $S_t$ is equal to the final destination node $D_i$. In the affirmative the variable flag is set to the value 2 (block 658) and the process exits. In the negative, the core algorithm is applied to the initial topology with source node $S_t$ and destination node $D_i$ (block 660).

Block 660 is followed by block 670 that checks if the destination node has been reached and in the negative the variable flag is set to 1 (block 698) and block 358 of FIG. 9 exits. In the affirmative, block 680 identifies the logical path comprising temporary source node and destination node $D_i$ in the same way block 335 of FIG. 9 does.

Block 680 is followed by block 690 that is a "Wavelength continuity check and segment optimization" module that performs the same actions as block 345, FIG. 9.

Block 690 is followed by block 695 that checks if wavelength continuity is assured. In the negative, the variable flag is set to 1 (block 698) and the process exits. In the positive, the algorithm is iterated until the temporary source coincides with the initial destination node (i.e. node E) (block 640).

Figure 29:
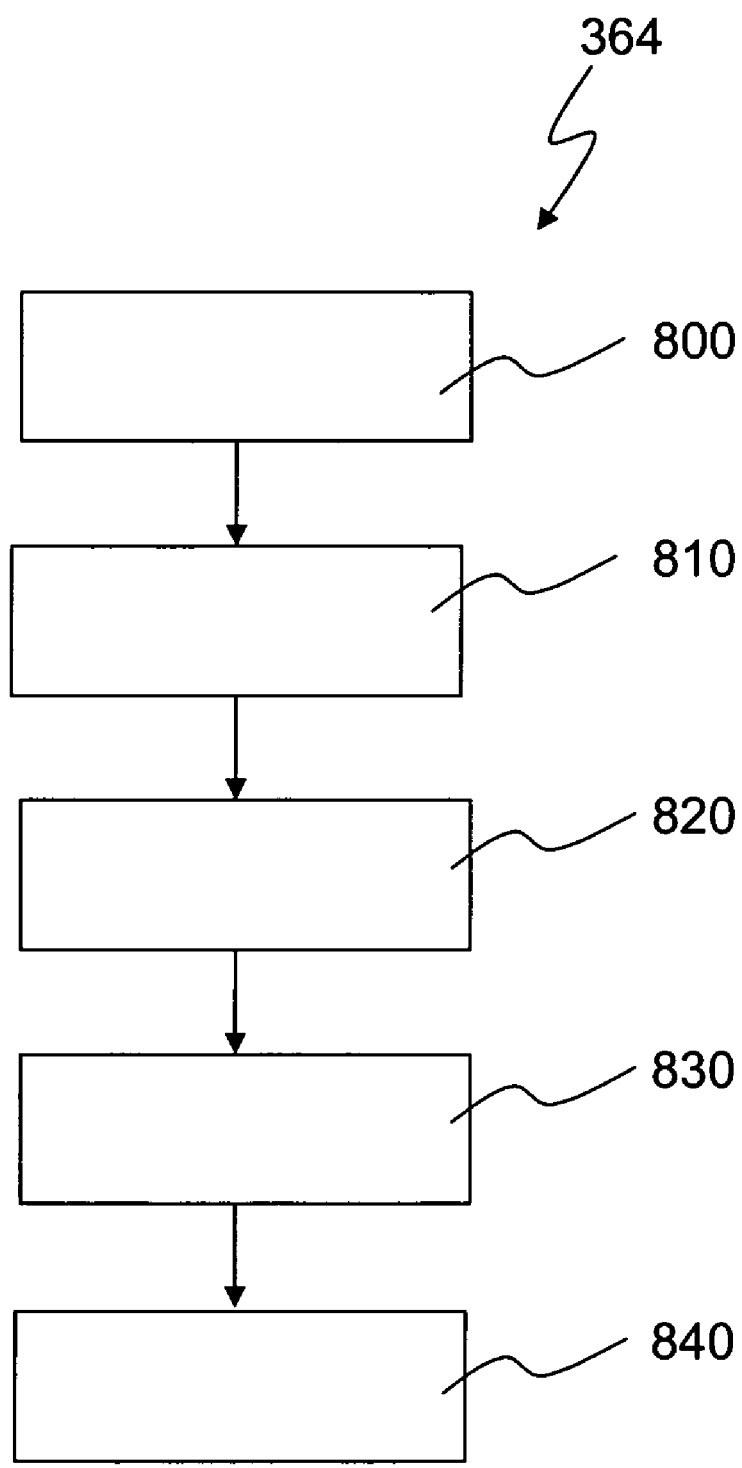

Once the "advanced solution" is identified, it is possible to refine the solution in terms of wavelengths, conversion and regeneration resources assignment (block 400 of FIG. 8, detailed in FIG. 29). The refinement process implies maximizing the length of transparent segments and minimizing the usage of conversion and regeneration resources.

The above refinement process is described with respect to the flow chart of FIG. 29.

The process comprises a block 800 where the path (nodes and links) obtained in the routing phase is stored.

Block 800 is followed by a block 810 where a single transparent node or a sequence of transparent nodes (i.e. those ones without conversion and/or regeneration resources) and their links are removed from the path (with the sole exception of the source and destination nodes) and replaced with a single equivalent link, characterized by an effective attenuation equal to the sum of the effective attenuations of the aggregated links plus the attenuation introduced by traversing nodes and a vector of available wavelengths equal to the intersection of the wavelength vectors associated to the links taken into account (e.g. wavelengths common to all links).

Block 810 is followed by a block 820 that comprises two actions:

action 1: removal of nodes (and associated links) with availability of just wavelength converters when wavelength continuity exists between the links in input to and output from those nodes. Removed nodes and links are replaced by an equivalent link characterized by an effective attenuation equal to the sum of the effective attenuations of the removed links and nodes and by a vector of available wavelengths equal to the intersection of the wavelength vectors associated to the links taken into account; and action 2: removal of nodes with availability of regeneration resources, the use of which is not necessary because wavelength continuity exists between the link in input and the one in output and the sum of the upstream and downstream Local Sums starting from the regeneration node under consideration up to the neighbouring regeneration node (or, upstream, up to the Source node and downstream, up to the Destination node) do not exceed the maximum effective attenuation Q allowed.

Block 820 is followed by block 830 comprising two actions:

action 1: simplification of functionality in nodes with availability of regeneration and conversion resources when the sum of the upstream and downstream Local Sums from the node under consideration up to the neighbouring regeneration nodes (or, upstream, up to the Source node and downstream, up to the Destination node) exceeds the value of maximum effective attenuation Q allowed. In this case, it is possible to assign just the regeneration functionality to the node; and action 2: simplification of functionality in nodes with availability of both regeneration and conversion resources when the sum of the upstream and downstream Local Sums from the node under consideration up to the neighbouring regenerators (or, upstream, up to the Source node and downstream, up to the Destination node) does not exceed the maximum value for effective attenuation Q allowed and there is not wavelength continuity. In this case, it is possible to assign just the conversion functionality to the node.

The obtained path after the above described process contains the source node, one or more nodes acting as wavelengths converter, one or more nodes acting as regeneration nodes (and then inherently as wavelengths converter), the destination node, some real links and some equivalent links.

Block 830 is followed by block 840 performing the following steps:

along the obtained path, sets of adjacent links (segments) that guarantee wavelength continuity along the path through intersection of the wavelength vectors associated with each link (physical or logical) are identified. For each segment, wavelength vector that guarantees continuity is stored;

for each segment, starting from the source node, the wavelength to be used on the segment is chosen among the ones that do not guarantee continuity on the adjacent segment. Among those wavelengths, those ones that are less available along the path are chosen. Finally among those wavelengths that one that is most available is chosen. This choice is made to preserve the availability of those wavelengths that can assure continuity when further requests are served;

if along one or more segments, a useful wavelength has not been identified in the previous step because all available wavelengths ensure continuity, then a wavelength is chosen among those ones that guarantee continuity over multiple segments. For each segment, the one most available is chosen from the set of wavelengths.

Finally the path to the destination is constructed taking into account the allocation of the wavelengths and the regeneration and conversion resources.

What above described will be detailed with the following example.

Figure 30:
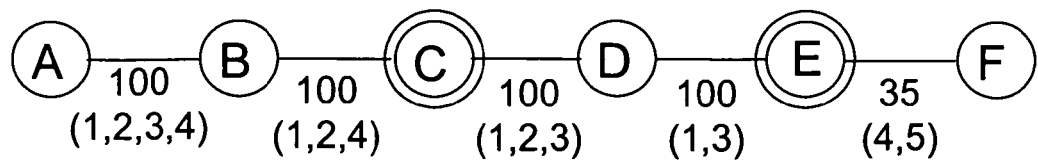

Let us consider the path shown in FIG. 30 having nodes with different characteristics:

nodes with availability of regeneration resources—node C
nodes with availability of wavelength converters—node D
nodes with availability of regeneration and wavelength conversion resources—node E
transparent nodes that is those nodes without regeneration and conversion capabilities/availability—nodes A, B and F.

In FIG. 30, the availability of wavelengths along a given link is represented by a vector and the effective attenuation by a scalar number. Let's consider a maximum effective attenuation Q=235.

Figure 31:
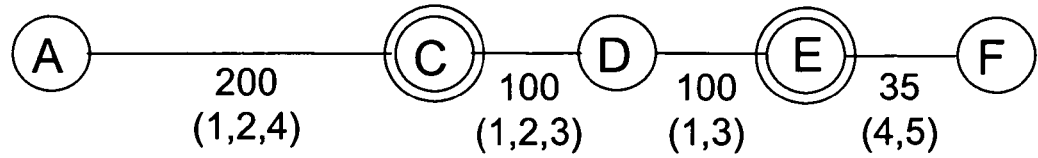

As above explained, block 810 transforms transparent nodes (except the source and destination nodes) and the adjacent links into equivalent links. Thus node B and the adjacent links are replaced and the path of FIG. 31 is created. In the figure, the equivalent link extending between nodes A and C has an effective attenuation (200) equal to the sum of the effective attenuations of the links A-B (i.e. 100) and B-C (i.e. 100) and a vector of available wavelengths equal to the intersection of the wavelength vectors associated to links A-B and B-C (i.e. (1,2,3,4) AND (1,2,4)=(1,2,4)). Node B attenuation is disregarded.

Block 820 performs two actions: it replaces the nodes with availability of just wavelength converters, the use of which is not necessary because wavelength continuity exists between the links in input to and output from those nodes. In the example wavelength continuity exist for wavelengths 1 and 3 between links C-D and D-E. Node D is replaced by an equivalent link characterized by an effective attenuation equal to the sum of the effective attenuations (200=100+100) of the aggregated links (C-D and D-E) and a vector of available wavelengths equal to the intersection of the wavelength vectors associated to links C-D and D-E (i.e. (1,2,3) AND (1,3)= (1,3)). Node D attenuation is disregarded.

Figure 32:
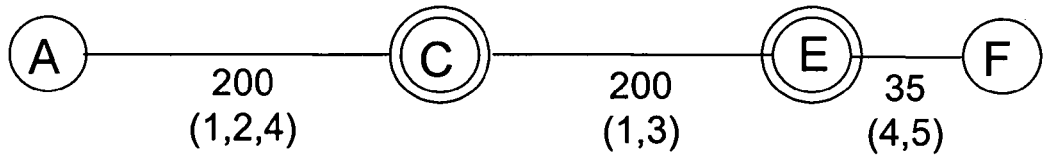

Moreover block 820 tries to further simplify the path removing node C. Node C is a node with regeneration resources and with wavelength continuity between the adjacent A-C and C-E links. However, the sum of the Local Sums (200 dB upstream Local Sum and 200 dB downstream Local Sum) is greater than the maximum value of effective attenuation Q allowed, and therefore it is not possible to replace node C. The path as modified by block 820 is show in FIG. 32.

Block 830 simplifies the nodes with availability of regeneration and conversion resources like node E as above explained.

Figure 33:
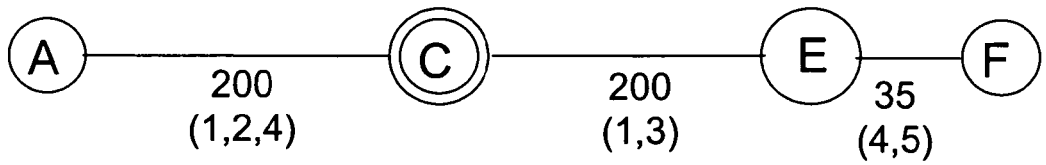

Node E is a node with both regeneration and conversion resources, for which the sum of the upstream (200 dB) and downstream (35 dB) Local Sums does not exceed the maximum value for effective attenuation Q and for which wavelength continuity between the input and output links is not assured. In this case, it is possible to simplify node E functionality assigning it just the conversion functionality (action 2). No node with both regeneration and conversion resources falling in action 1 exists along the path taken into account. The result is the path of FIG. 33 where E is now a wavelength converter node only.

Block 840 identifies the segments (real and/or equivalent) that guarantee wavelength continuity along the path through intersection of the wavelength vectors associated with each link. In the example, links A-C and C-E ensure wavelength continuity (by $\lambda_1$) and constitute a segment (i.e. segment 1). Link E-F with the associated wavelength $\lambda_4$ represents another segment (i.e. segment 2). In the first segment, $\lambda_1$ ensures wavelength continuity and shouldn't therefore be taken into account. $\lambda_2$ and $\lambda_4$ should be taken into account on link A-C, $\lambda_3$ on link C-E, and $\lambda_4$ and $\lambda_5$ on link E-F. On the segment 1, $\lambda_2$ should be chosen instead of $\lambda_4$ because $\lambda_4$ is more frequent along the entire path and $\lambda_3$ should be chosen along the segment C-E. On the segment E-F, $\lambda_5$ should be chosen instead of $\lambda_4$ because $\lambda_4$ is more frequent along the entire path.

Figure 34:
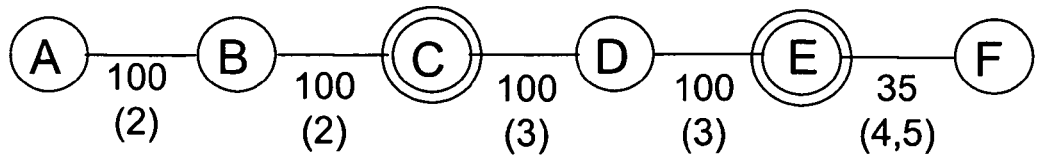

In the example considered, the route obtained is shown in FIG. 34, where the wavelengths are the ones to be used in the setup. It should be noted that node D is used as a transparent node. Node C is used both to regenerate the signal and to convert the wavelength. The selected wavelength along the path from node A to node E is not $\lambda_1$ because it assures wavelength continuity. It is preferred to use $\lambda_2$ and $\lambda_3$ that cannot enable transparent service allocation on that path being node C regeneration capability required to serve the routing requests.

The invention claimed is:

1. A method, implemented by a computer, for dynamic routing an optical signal in an optical network comprising a plurality of nodes, the method comprising:

executing, by the computer, a shortest-path algorithm receiving input information concerning a source node, a destination node and a topology of the optical network, and providing as output a shortest-path tree comprising nodes and arcs connecting the nodes, the shortest-path tree comprising a plurality of branches along which an effective attenuation accumulated by the optical signal is at most equal to a predetermined limit, each branch comprising an end node and each end node being associated with a corresponding set of wavelengths;

checking, for each end node that has no wavelength conversion resources and for each wavelength of the corresponding set of wavelengths, if the end node is connected to at least another node external to the corresponding branch through the wavelength;

excluding, for any end node for which the result of the checking is negative for at least one wavelength of the corresponding set of wavelengths, the at least one wavelength from the corresponding set of wavelengths, thus updating the topology; and re-executing, by the computer, the shortest-path algorithm with the updated topology.

2. The method of claim 1, further comprising:
varying, if the result of the checking is positive for all the end nodes and for all the wavelengths of the corresponding set of wavelengths, a value of a parameter;
updating network parameters based on the current value of the parameter, thus updating the topology; and
re-executing the shortest-path algorithm with the updated topology.

3. The method of claim 1, wherein the checking is a first checking and wherein the method further comprises:
second checking, if the result of the first checking is positive for all the end nodes and for all the wavelengths of the corresponding set of wavelengths, if any one of the end nodes coincides with the destination node,
wherein the shortest-path algorithm is re-executed only if the result of the second checking is negative.

4. The method of claim 2, further comprising:
third checking if a current value of the parameter is over a predetermined threshold;
wherein the shortest-path algorithm is re-executed only if the result of the third checking is negative.

5. The method of claim 2, wherein executing the shortest-path algorithm comprises growing the shortest-path tree by adding new nodes, and wherein a new node is added to the branch if at least one among the following conditions is met:
a cumulated degradation loss from the source node to the new node along the branch is less than a maximum permitted value;
wavelength continuity is assured from the source node to the new node along the branch or from a wavelength converter resource in the same branch of the end node and the end node; and
an overall cost function from the source node to the new node along the branch is minimum with respect to other possible new nodes.

6. The method of claim 5, wherein the cumulated degradation loss is zeroed if the new node is a regeneration node.

7. The method of claim 5, wherein the overall cost function is dependent on at least one among the following:
the parameter;
available wavelengths in a link to the new node;
available regeneration resources in the new node; and
cumulated degradation loss of the signal.

8. The method of claim 5, wherein the overall cost function is calculated by a first expression if the cumulated degradation loss of the signal along the branch is less than a limit value, and by a second expression if the cumulated degradation loss of the signal along the branch is higher than the limit value.

9. The method of claim 8, wherein the first expression favours new nodes having a larger number of regeneration resources and reachable through links with greater wavelength availability, and the second expression favours new nodes for which the possibility of reaching a regenerator is known in advance.

10. The method of claim 1, further comprising:
fourth checking if the destination node is comprised in the shortest-path tree; and
activating a non-linear searching if the result of the fourth checking is negative.

11. The method of claim 10, wherein when the executing the shortest-path algorithm is a first executing and the shortest-path tree is a first shortest-path tree, the non-linear searching comprises:
second executing the shortest-path algorithm receiving input information concerning a temporary source node and a temporary destination node, and providing as output a second shortest-path tree;
identifying all regenerators included in the first or second shortest-path tree;
fifth checking if the destination node is included in the first or second shortest-path tree;
creating a plurality of logical segments each comprising:
the source node or a first regenerator of the identified regenerators as a first end; and
the destination node or a second regenerator of the identified regenerators as a second end; and
sixth checking if each of the identified regenerators has acted as the temporary source node in the second executing.

12. The method of claim 11, further comprising:
choosing, if the result of the sixth checking is negative, a temporary regenerator of the identified regenerators that has not acted as the temporary source node in the second executing; and
re-executing the shortest-path algorithm with the temporary regenerator acted as the temporary source node.

13. The method of claim 11, further comprising:
seventh checking, if the result of the sixth checking is positive, if at least one of the plurality of logical segments includes the source node and at least one of the plurality of logical segments includes the destination node.

14. The method of claim 13, further comprising:
calculating, if the result of the seventh checking is positive, a logical path between the source node and the destination node by joining logical segments via regenerators.

15. The method of claim 14, further comprising:
determining a cost of the logical path and determining a least cost logical path.

* * * * *